US012633259B2

United States Patent

Lee et al.

(10) Patent No.: US 12,633,259 B2

(45) Date of Patent: May 19, 2026

(54) PIXEL CIRCUIT AND DISPLAY DEVICE INCLUDING THE SAME

(71) Applicant: LG Display Co., Ltd., Seoul (KR)

(72) Inventors: Hyun Suk Lee, Paju-si (KR); Seung Jin Yoo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/930,283

(22) Filed: Oct. 29, 2024

(65) Prior Publication Data

US 2025/0218368 A1 Jul. 3, 2025

(30) Foreign Application Priority Data

Dec. 28, 2023 (KR) ........................ 10-2023-0193950

(51) Int. Cl.

*G09G 3/3233* (2016.01)

*G09G 3/3291* (2016.01)

(52) U.S. Cl.

CPC ......... *G09G 3/3233* (2013.01); *G09G 3/3291* (2013.01); *G09G 2300/023* (2013.01); *G09G 2300/0819* (2013.01); *G09G 2300/0861* (2013.01); *G09G 2320/0295* (2013.01); *G09G 2320/045* (2013.01);

(Continued)

(58) Field of Classification Search

CPC ....... G09G 3/30–3291; G09G 2300/08; G09G 2300/0809; G09G 2300/0842–0852; G09G 2300/088–089; G09G 2320/0257; G09G 2320/043–048; G09G 3/3233; G09G 2300/023; G09G 2300/0819; G09G 2300/0861; G09G 2320/0295;

(Continued)

(56) References Cited

U.S. PATENT DOCUMENTS

2016/0104423 A1 4/2016 Park et al.

2020/0168163 A1 5/2020 Kim et al.

(Continued)

FOREIGN PATENT DOCUMENTS

KR 10-2016-0043594 A 4/2016

KR 10-2017-0123388 A 11/2017

(Continued)

OTHER PUBLICATIONS

Office Action dated Apr. 11, 2025 issued in corresponding UK Patent Application No. GB2415941.0.

*Primary Examiner* — Roberto W Flores

(74) *Attorney, Agent, or Firm* — Morgan, Lewis & Bockius LLP

(57) ABSTRACT

A pixel circuit includes a driving element including a first electrode connected to a first power line, a gate electrode connected to a first node, and a second electrode connected to a second node; a first switch element configured to apply a data voltage to the first node in response to a first gate signal; a second switch element configured to connect a third node to the second node in response to a reset signal or the first gate signal; a third switch element configured to connect a sensing line to the third node in response to a second gate signal; a fourth switch element configured to connect a second power line to the third node in response to a third gate signal; a capacitor connected between the first node and the second node; and a light-emitting element connected between the second node and the third node.

11 Claims, 39 Drawing Sheets

(52) U.S. Cl.
CPC ............... *G09G 2320/0673* (2013.01); *G09G 2330/022* (2013.01); *G09G 2330/028* (2013.01); *G09G 2330/12* (2013.01)

(58) Field of Classification Search
CPC ..... G09G 2320/045; G09G 2320/0673; G09G 2330/022; G09G 2330/028; G09G 2330/12
See application file for complete search history.

(56) References Cited

U.S. PATENT DOCUMENTS

| | | | | |
|---|---|---|---|---|
| 2021/0390911 | A1* | 12/2021 | Kim ..................... | G09G 3/3266 |
| 2022/0114964 | A1* | 4/2022 | Wu ...................... | G09G 3/3258 |
| 2022/0208111 | A1* | 6/2022 | Baek .................... | G09G 3/3266 |
| 2024/0046871 | A1* | 2/2024 | Chung ................. | G09G 3/3275 |

FOREIGN PATENT DOCUMENTS

| | | | |
|---|---|---|---|
| KR | 10-2020-0063720 | A | 6/2020 |
| KR | 10-2023-0009258 | A | 1/2023 |

* cited by examiner

PIXEL CIRCUIT AND DISPLAY DEVICE INCLUDING THE SAME

CROSS-REFERENCE TO RELATED APPLICATION

This application claims priority to and the benefit of Korean Patent Application No. 10-2023-0193950, filed on Dec. 28, 2023, the disclosure of which is incorporated herein by reference in its entirety.

BACKGROUND

Field

The present disclosure relates to a pixel circuit and a display device including the same.

Description of Related Art

Display devices includes a liquid crystal display (LCD) device, an electroluminescence display device, a field emission display (FED) device, a plasma display panel (PDP), and the like.

Electroluminescent display devices are divided into inorganic light emitting display devices and organic light emitting display devices according to a material of a light emitting layer. An active-matrix type organic light emitting display device includes an organic light emitting diode (hereinafter referred to as an "OLED") which emits light by itself, and has advantages in that a response speed is fast and luminous efficiency, luminance, and a viewing angle are large.

Some of display devices, for example, a liquid crystal display device or an organic light emitting display device includes a display panel including a plurality of sub-pixels, a driver outputting a driving signal for driving the display panel, a power supply generating power to be supplied to the display panel or the driver, and the like. The driver includes a gate driver that supplies a gate signal, such as a scan signal and emission signal to the display panel, and a data driver that supplies a data signal to the display panel.

SUMMARY

Each of a plurality of pixels includes an OLED and a driving element which supplies current that flows to the OLED according to a gate-source voltage Vgs. Since an afterimage may appear on a screen due to deterioration of the OLED in addition to the driving element, various schemes for being able to sense deterioration information of the OLED have been presented.

However, the operating voltage of the OLED is unable to be directly sensed, and a deterioration tendency is sensed by using an operating point relationship between the driving element and the OLED. If such a deterioration tendency is sensed, the characteristic of the driving element is unable to be completely excluded, and thus a work for compensating for this is required.

The present disclosure is directed to a pixel circuit and a display device including the same that substantially solve or obviate one or more of the problems described above.

It should be noted that objects of the present disclosure are not limited to the above-described objects, and other objects of the present disclosure will be apparent to those skilled in the art from the following descriptions.

To achieve these objects and other advantages of the present disclosure, as embodied and broadly described herein, a pixel circuit may include a driving element including a first electrode connected to a first power line, a gate electrode connected to a first node, and a second electrode connected to a second node; a first switch element configured to apply a data voltage to the first node in response to a first gate signal; a second switch element configured to connect a third node to the second node in response to a reset signal or the first gate signal; a third switch element configured to connect a sensing line to the third node in response to a second gate signal; a fourth switch element configured to connect a second power line to the third node in response to a third gate signal; a capacitor connected between the first node and the second node; and a light-emitting element connected between the second node and the third node.

In another aspect of the present disclosure, a pixel circuit may include a driving element including a first electrode connected to a first power line, a gate electrode connected to a first node, and a second electrode connected to a second node; a first switch element configured to apply a data voltage to the first node in response to a first gate signal; a second switch element configured to connect a sensing line to the second node in response to a second gate signal; a third switch element configured to connect the sensing line to a third node in response to a third gate signal; a fourth switch element configured to connect a second power line to the third node in response to a fourth gate signal; a capacitor connected between the first node and the second node; and a light-emitting element connected between the second node and the third node.

In yet another aspect of the present disclosure, a display device may include a pixel array in which a plurality of data lines, a plurality of gate lines, and a plurality of pixel circuits are disposed; a data driver configured to output a data voltage to the plurality of data lines; and a gate driver configured to output a gate signal to the plurality of gate lines, wherein each of the pixel circuits includes a driving element including a first electrode connected to a first power line, a gate electrode connected to a first node, and a second electrode connected to a second node; a first switch element configured to apply a data voltage to the first node in response to a first gate signal; a second switch element configured to connect a third node to the second node in response to a reset signal; a third switch element configured to connect a sensing line to the third node in response to a second gate signal; a fourth switch element configured to connect a second power line to the third node in response to a third gate signal; a capacitor connected between the first node and the second node; and a light-emitting element connected between the second node and the third node.

In yet another aspect of the present disclosure, a display device may include a pixel array on which a plurality of data lines, a plurality of gate lines, and a plurality of pixel circuits are disposed; a data driver configured to output a data voltage to the plurality of data lines; and a gate driver configured to output a gate signal to the plurality of gate lines, wherein each of the pixel circuits includes a driving element including a first electrode connected to a first power line, a gate electrode connected to a first node, and a second electrode connected to a second node; a first switch element configured to apply a data voltage to the first node in response to a first gate signal; a second switch element configured to connect a sensing line to the second node in response to a second gate signal; a third switch element configured to connect the sensing line to a third node in response to a third gate signal; a fourth switch element configured to connect a second power line to the third node in response to a fourth gate signal; a capacitor connected between the first node and the second node; and a light-emitting element connected between the second node and the third node.

According to example embodiments of the present disclosure, the operating voltage of the light-emitting element may be directly sensed in a state where the characteristic of the driving element is completely excluded by additionally constituting a switch element for sensing the operating voltage of the light-emitting element.

Even in the structure in which the sensing line is shared, it is possible to extract the characteristic of the light-emitting element for each pixel by applying a data voltage of a relatively high voltage level to the pixel circuit that is intended to be sensed and by applying a data voltage of a relatively low voltage level to the pixel circuit that is not to be sensed.

According to example embodiments of the present disclosure, since the pixel circuit may be selectively sensed, low-power driving may be possible.

The effects of example embodiments of the present disclosure are not limited to the above-mentioned effects, and other effects that are not mentioned will be apparently understood by those skilled in the art from the following description and the appended claims.

Additional features and aspects of the present disclosure will be set forth in the description that follows and in part will become apparent from the description or may be learned by practice of the inventive concepts provided herein. Other features and aspects of the inventive concepts may be realized and attained by the structure particularly pointed out in, or derivable from, the written description, claims hereof, and the appended drawings.

It is to be understood that both the foregoing general description and the following detailed description of the present disclosure are by way of example and are intended to provide further explanation of the disclosures.

BRIEF DESCRIPTION OF THE DRAWINGS

The accompanying drawings, which are included to provide a further understanding of the disclosure and are incorporated in and constitute a part of this application, illustrate example embodiments of the disclosure and together with the description serve to explain the principles of the disclosure. In the drawings.

DETAILED DESCRIPTION

Figure 1:
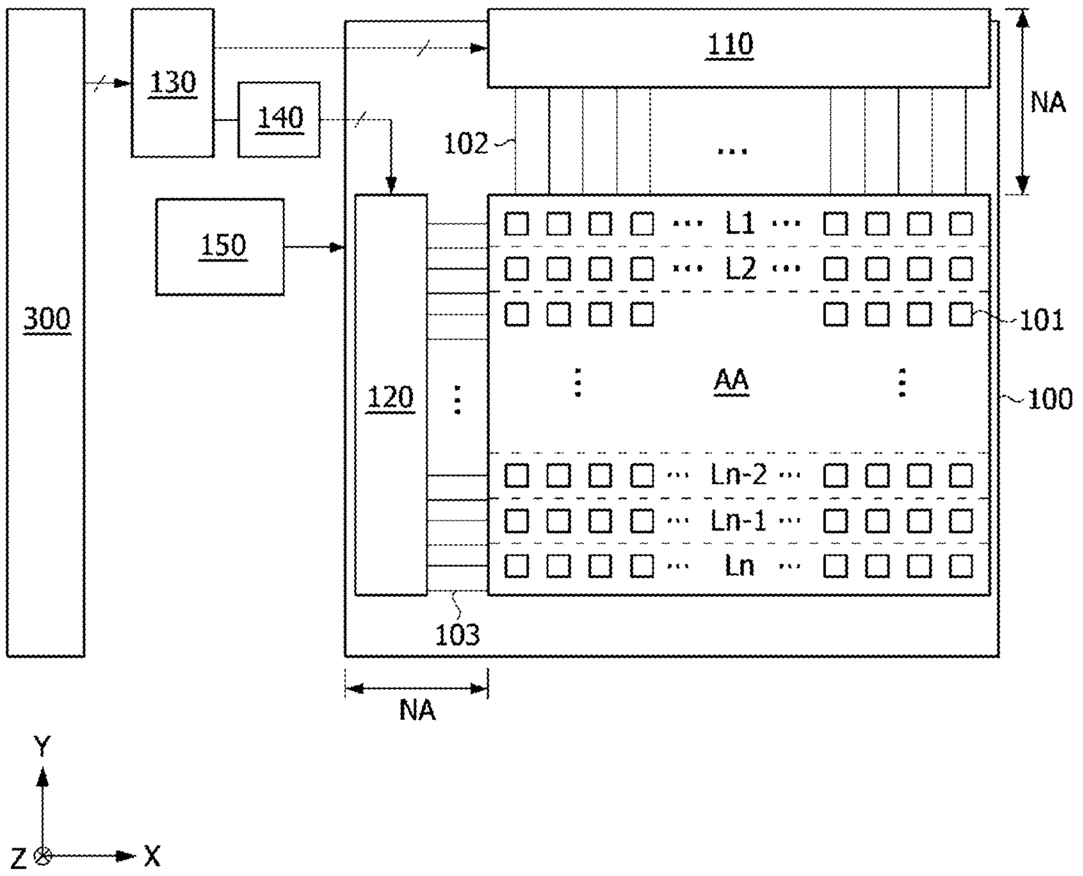
FIG. 1 is a block diagram showing a display device according to an embodiment of the present disclosure.

Advantages and features of the present disclosure and methods of achieving them will become apparent with reference to the example embodiments described below in detail in conjunction with the accompanying drawings. The present disclosure may, however, be embodied in different forms and should not be construed as limited to the example embodiments set forth herein. Rather, these example embodiments are provided so that this disclosure will be thorough and complete and will fully convey the scope of the present disclosure to those skilled in the art.

The shapes, dimensions, areas, lengths, thicknesses, ratios, angles, numbers, and the like, which are illustrated in the drawings to describe various example embodiments of the present disclosure, are merely given by way of example. Therefore, the present disclosure is not limited to such illustrated details in the drawings. Like reference numerals generally denote like elements throughout the specification, unless otherwise specified.

In the following description, where a detailed description of a relevant known function or configuration may unnecessarily obscure aspects of the present disclosure, a detailed description of such a known function or configuration may be omitted or be briefly discussed.

Where a term like "comprising," "having," or "including" is used, one or more other elements may be added unless the term is used with a more limiting term, such as "only." An element described in a singular form may include a plurality of elements, and vice versa, unless the context clearly indicates otherwise.

In construing an element, the element should be construed as including an ordinary error or tolerance range even where no explicit description of such an error or tolerance range is provided.

Where a positional relationship between two elements is described with such a term as "on," "at an upper portion,"

"at a lower portion," "next to," or the like, one or more other elements may be located between the two elements unless the term is used with a more limiting term, such as "imme-diate(ly)" or "direct(ly)."

Although terms "first," "second," and the like may be used herein to describe various elements, these elements should not be interpreted to be limited by these terms as they are not used to define a particular essence, order, sequence, precedence, or number of such elements. These terms are used only to refer one element separately from another. For example, a first element could be termed a second element, and a second element could similarly be termed a first element, without departing from the scope of the present disclosure The same reference numerals may refer to substantially the same elements throughout the present disclosure.

Features of various embodiments of the present disclosure may be partially or wholly coupled to or combined with each other, and may be operated, linked, or driven together in various ways as those skilled in the art can sufficiently understand. The embodiments of the present disclosure may be carried out independently from each other, or may be carried out together in association with each other.

Hereinafter, various example embodiments of the present disclosure will be described in detail with reference to the accompanying drawings.

In a display device according to example embodiments of the present disclosure, the pixel circuit and the gate driving circuit may include a plurality of transistors. Transistors may be implemented as oxide thin film transistors (oxide TFTs) including an oxide semiconductor, low temperature poly-silicon (LTPS) TFTs including low temperature polysilicon, or the like.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS), since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of the n-channel transistor, a gate-on voltage may be a gate high voltage, and a gate-off voltage may be a gate low voltage. In the case of the p-channel transistor, a gate-on voltage may be a gate low voltage, and a gate-off voltage may be a gate high voltage.

Figure 2:
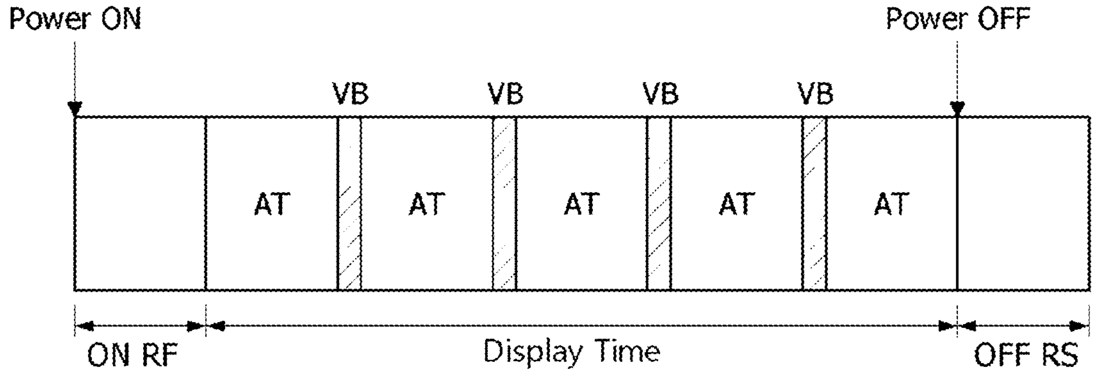
FIG. 2 is a diagram showing time to enter a sensing mode in a driving sequence of a display device.

FIG. 1 is a block diagram showing a display device according to an embodiment of the present disclosure. FIG. 2 is a diagram showing time to enter a sensing mode in a driving sequence of a display device.

As shown in FIG. 1, the display device according to an embodiment of the present disclosure includes a display panel 100, and a display panel driving circuit for writing pixel data to pixels of the display panel 100. Additionally, the display device includes a power supply 150.

The display panel 100 may be, but not limited to, a panel having a rectangular structure with a length in the X-axis direction, a width in the Y-axis direction, and a thickness in the Z-axis direction. For example, the display panel 100 may be a heterogeneous panel of which at least a portion is curved or elliptical.

The display area AA of the display panel 100 includes a pixel array to display an input image. The pixel array includes a plurality of data lines 102, a plurality of gate lines 103 crossing the data lines 102, and pixels arranged in a matrix form. The display panel 100 may further include power lines commonly connected to the pixels. The power lines may be commonly connected to pixel circuits to supply a voltage required for driving pixels 101 to the pixels 101.

Each of the pixels 101 may be divided into a red sub-pixel, a green sub-pixel, and a blue sub-pixel for color implementation. Each pixel may further include a white sub-pixel. Each sub-pixel includes a pixel circuit for driving a light emitting element. The light emitting element may include an OLED or an inorganic light emitting diode (LED). Each pixel circuit is connected to the data lines, the gate lines, and the power lines. In the following description, a pixel may be interpreted as a sub-pixel.

The pixels may be arranged as real color pixels and pentile pixels. A pentile pixel may realize a higher resolution than a real color pixel by driving two sub-pixels with different colors as one pixel 101 and using a preset pixel rendering algorithm. This pixel rendering algorithm may compensate for insufficient color representation in each pixel with the color of light emitted from adjacent pixels.

Each of the pixels may include at least one first light-emitting element that emits light in first mode, and a second light-emitting element that emits light in second mode. Each of the pixels 101 emits light from the first light-emitting element at a wide viewing angle in first mode, while emitting light from the second light-emitting element at a narrow viewing angle in second mode.

The display area AA includes a plurality of pixel lines L1 to Ln. Each of the pixel lines L1 to Ln includes one line of pixels arranged along the line direction (X-axis direction) in the pixel array of the display panel 100. Those pixels arranged in one pixel line share the gate lines 103. The sub-pixels arranged in the column direction Y along the data line direction share the same data line 102. One horizontal period is a time obtained by dividing one frame period by the total number of pixel lines L1 to Ln.

The display panel 100 may be implemented with a non-transmissive display panel or a transmissive display panel. The transmissive display panel may be applied to a transparent display device in which an image is displayed on the screen and a real object in the background is visible. The display panel 100 may be made of a flexible display panel.

The power supply 150 receives an input voltage applied from the host system 300 and outputs a voltage needed to drive the pixels 101 of the display panel 100 and the display panel driving circuit. To this end, the power supply 150 may include a direct current to direct current converter (DC-DC converter). The DC-DC converter may include a charge pump, a regulator, a buck converter, a boost converter, and the like. The power supply 150 may output a constant voltage (or direct current voltage), such as gate-on voltage, gate-off voltage, pixel driving voltage, cathode voltage, reference voltage, IC driving voltage of the display panel driving circuit, through the DC-DC converter. The gate-on voltage and the gate-off voltage may be supplied to the level shifter 140 and the gate driver 120. Voltages such as pixel driving voltage, cathode voltage, and reference voltage may be supplied to the pixels 101 through the power lines commonly connected to the pixels 101.

The power supply 150 may further include a gamma voltage generator. The gamma voltage generator receives a high-potential reference voltage and a low-potential reference voltage and outputs a plurality of gamma reference voltages divided at specific intervals on a preset gamma curve, for example, a 2.2 gamma curve. The gamma reference voltages are supplied to the data driver 110. In the data driver 110, the gamma reference voltages are subdivided by a voltage dividing circuit into grayscale voltages. The gamma voltage generator may be implemented with a programmable gamma circuit that may adjust the voltage of each of the gamma reference voltages according to digital data. The timing controller 130, the host system 300, or a separate external device may update digital data stored in a register of the programmable gamma circuit through a communication interface.

The display panel driving circuit writes pixel data of the input image to the pixels 101 of the display panel 100 under the control of the timing controller 130. The display panel driving circuit includes a data driver 110 and a gate driver 120.

The display panel driving circuit may further include a touch sensor driver for driving touch sensors. The touch sensor driver is not shown in FIG. 1. The data driver 110 and the touch sensor driver may be integrated into one source drive IC.

The data driver 110 receives pixel data of the input image as a digital signal from the timing controller 130 and outputs a data voltage. The data driver 110 may receive gamma reference voltages and generate gamma compensation voltages for each grayscale through a voltage dividing circuit. The per-grayscale gamma compensation voltages are supplied to a digital to analog converter (hereinafter referred to as "DAC") disposed in each channel of the data driver 110.

The data driver 110 samples and latches digital data received from the timing controller 130 and then inputs the digital data to the DAC. Here, the digital data includes pixel data of the input image. Additionally, the digital data may include mode selection data for selecting first mode and second mode. The DAC converts the pixel data into a gamma compensation voltage and outputs a data voltage of the pixel data.

The data driver 110 may apply a data voltage of a predetermined voltage level to a pixel circuit selected for sensing in a first sensing mode for sensing the threshold voltage of the driving element in the pixel circuit, and may apply a data voltage of 0 V or a black grayscale to a pixel circuit that is not selected.

The data driver 110 may apply a data voltage of a maximum voltage level or a data voltage generated using a maximum gamma voltage to a pixel circuit selected for sensing in a second sensing mode for sensing the threshold voltage of the light-emitting element in the pixel circuit, and may apply a data voltage of 0 V or a black grayscale to a pixel circuit that is not selected.

The gate driver 120 may be formed on the display panel 100 together with the circuit elements and wiring lines of the display area AA. The gate driver 120 may be disposed in at least one of left and right non-display areas NA outside the display area AA in the display panel 100 or at least a part thereof may be disposed within the display area AA.

The gate driver 120 may be disposed in the non-display areas NA on both sides of the display panel 100 with the display area AA of the display panel interposed therebetween to supply gate pulses on both sides of the gate lines 103 in a double feeding method. In another embodiment, the gate driver 120 may be disposed in at least one of the left and right non-display areas NA of the display panel 100 to supply gate signals to the gate lines 103 in a single feeding method. The gate driver 120 sequentially outputs pulses of the gate signals to the gate lines 103 under the control of the timing controller 130. The gate driver 120 may sequentially supply the gate signals to the gate lines 103 by shifting the pulses of the gate signals using shift registers. When a plurality of gate signals are applied to each pixel, the gate driver 120 may include a plurality of shift registers. The gate signal may include a scan signal being input to the pixel circuit through a plurality of gate lines, and an emission signal (or EM signal).

The timing controller 130 receives digital video data of an input image and a timing signal synchronized with this data from the host system 300. The timing signal may include a vertical synchronization signal Vsync, a horizontal synchronization signal Hsync, and a data enable signal DE. Since the vertical period and horizontal period may be known by counting the data enable signal DE, the vertical synchronization signal Vsync and the horizontal synchronization signal Hsync may be omitted. The horizontal synchronization signal Hsync and the data enable signal DE have a periodicity of 1 horizontal period (1H).

The timing controller 130 may control the display panel driving circuit by generating a data timing control signal for controlling the operation timing of the data driver 110 and a gate timing control signal for controlling the operation timing of the gate driver 120 based on the timing signals Vsync, Hsync, DE received from the host system 300. The timing controller 130 may synchronize the data driver 110 and the gate driver 120 by controlling the operation timing of the display panel driving circuit.

The gate timing control signal output from the timing controller 130 may be input to the shift register of the gate driver 120 through the level shifter 140. The level shifter 140 may convert a voltage of the gate timing control signal received from the timing controller 130 to a swing width between the gate-on voltage and the gate-off voltage and supply it to the gate driver 120.

The host system 300 may include a main board of one of a television system, a set-top box, a navigation system, a personal computer (PC), a vehicle system, a mobile terminal, and a wearable terminal. The host system 300 may scale an image signal from a video source according to the resolution of the display panel 100, and may transmit it to the timing controller 130 together with the timing signals.

The host system 300 may transmit a mode signal having different logic values in first mode and second mode together with an image signal to the timing controller 130 at least once per frame.

The display panel driving circuit writes the pixel data of the input image into the pixels 101 by scanning the pixels in the display mode under the control of the timing controller 130. In the display mode, the input image is reproduced on the display area AA. The sensing circuit sequentially senses the threshold voltages of the driving elements in all the sub-pixels by sensing the sub-pixels in the display area AA line by line in the sensing mode.

The display device may enter the sensing mode in at least one of the following sequences: a Power ON sequence in which power is applied to the display device, a Vertical Blank time VB within the display time, and a Power OFF sequence in which the power-off switch of the display device is turned on, as shown in FIG. 2. The vertical blank time VB is a blank period, excluding an active period AT, during which the pixel data of the input image is written to the pixels within a one-frame period. During the vertical blank time VB, no pixel data is inputted to the data driver 110 and no pixel data is written to the sub-pixels. During the active period AT, the pixel data DATA' is inputted to the data driver 110, and the data voltage outputted from the data driver 110 is charged to the sub-pixels so that the pixel data is written to the sub-pixels.

In the Power OFF sequence, the sensing circuit is further driven for a predetermined period of time after the power-off switch is turned on to sense the threshold voltage of the driving element in each of the sub-pixels, and then stops its driving when the power is cut off. During the sensing time, the sensing data Dsen outputted from the sensing channels of the data driver 110 is transmitted to the timing controller 130.

Figure 3:
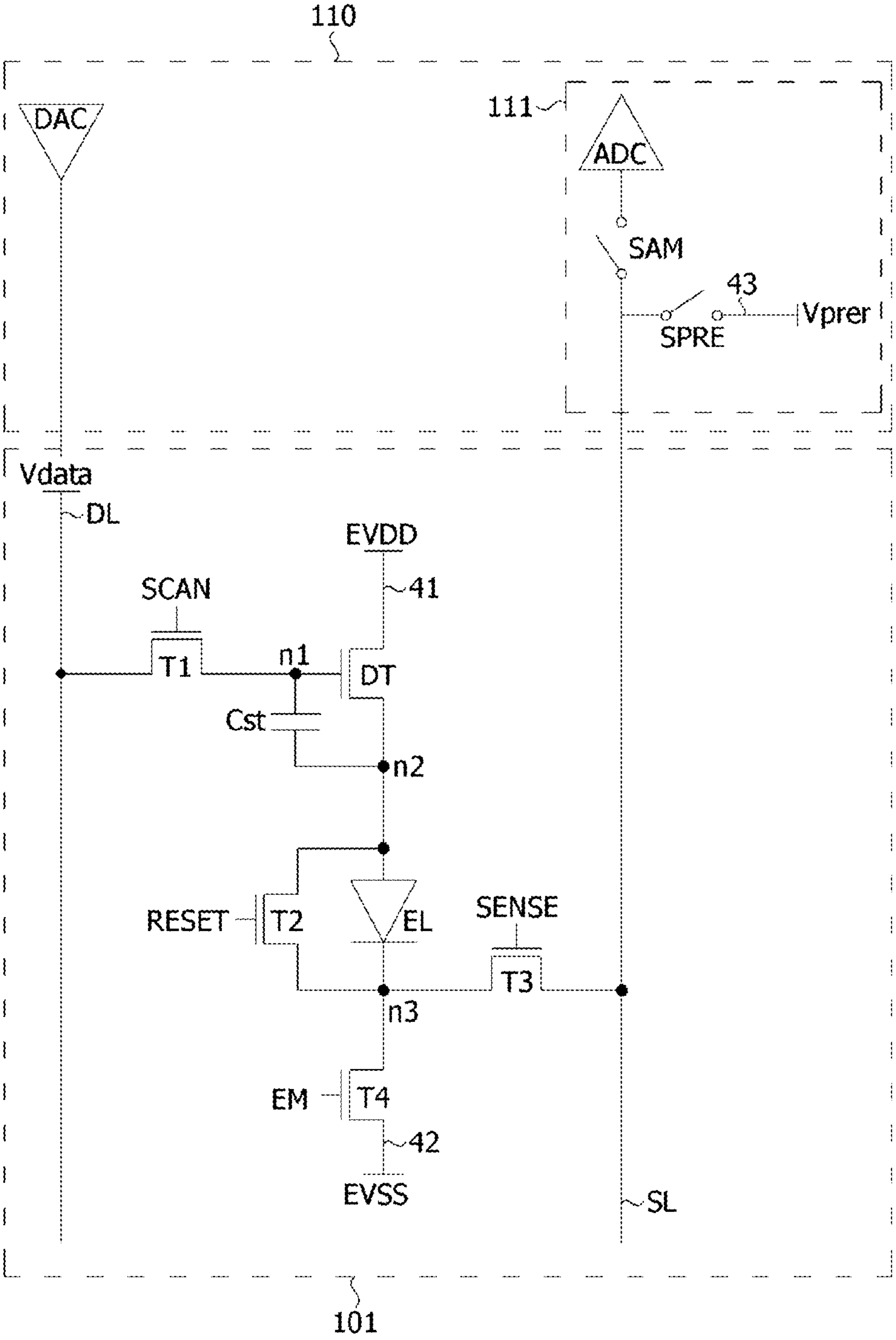
FIG. 3 is a diagram showing a pixel circuit and a compensation circuit according to a first embodiment of the present disclosure.

FIG. 3 is a diagram showing a pixel circuit and a compensation circuit according to a first embodiment of the present disclosure.

As shown in FIG. 3, a pixel circuit according to the first embodiment includes a light-emitting element EL, a driving element DT that supplies current to the light-emitting element EL, a plurality of switch elements T1 to T4 which switch a current path connected to the driving element DT, and a capacitor Cst that stores a gate-source voltage of the driving element DT. The driving element DT and the plurality of switch elements T1 to T4 may be implemented as N-channel TFTs, but are not limited thereto.

The light-emitting element EL emits light by current that is applied through a channel of the driving element DT according to the gate-source voltage Vgs of the driving element DT that is changed according to a data voltage Vdata. The light-emitting element EL may be implemented as an OLED including an organic compound layer formed between an anode and a cathode. The organic compound layer may include a hole injection layer HIL, a hole transport layer HTL, a light emission layer EML, an electron transport layer ETL, and an electron injection layer EIL, but is not limited thereto. The anode of the light-emitting element EL is connected to the driving element DT through a third node n3, and the cathode of the light-emitting element EL is connected to a low-potential power voltage line 42 to which a low-potential power voltage EVSS is applied.

The OLED that is used as the light-emitting element EL may be a tandem structure in which a plurality of light emission layers are stacked. The OLED of the tandem structure can improve the luminance and lifetime of pixels.

The driving element DT drives the light-emitting element EL by supplying current to the light-emitting element EL according to the gate-source voltage Vgs. The driving element DT includes a gate electrode connected to a first node n1, a first electrode (or drain) connected to a pixel driving voltage line to which a pixel driving voltage EVDD is applied or a first power line 41, and a second electrode (or source) connected to a second node n2.

The first switch element T1 is turned on according to a gate-on voltage of a first gate signal SCAN, and connects a data line DL to the first node n1 to supply the data voltage Vdata to the first node n1. The first switch element T1 includes a gate electrode to which the first gate signal SCAN is applied, a first electrode connected to the data line DL, and a second electrode connected to the first node n1.

The second switch element T2 is turned on according to a reset signal RESET, and connects the second node n2 to the third node n3. The second switch element T2 includes a gate electrode to which a reset signal RESET is applied, a first electrode connected to the second node n2, and a second electrode connected to the third node n3.

The third switch element T3 is turned on according to a gate-on voltage of a second gate signal SENSE, and connects a sensing line SL or a third power line 43 to the third node n3 to supply a reference voltage to the third node n3. The third switch element T3 includes a gate electrode to which the second gate signal SENSE is applied, a first electrode connected to the third node n3, and a second electrode connected to the third power line 43 to which the reference voltage is applied.

The fourth switch element T4 is turned on according to a gate-on voltage of a third gate signal EM, and connects a pixel base voltage line to which a pixel base voltage EVSS is applied or a second power line 42 to the third node n3. The fourth switch element T4 includes a gate electrode to which the third gate signal EM is applied, a first electrode connected to the third node n3, and a second electrode connected to the second power line 42.

The capacitor Cst may be connected between the first node n1 and the second node n2. The capacitor Cst may be charged with the gate-source voltage Vgs of the driving element DT.

A compensation circuit may include a sensing part 111 connected to the pixel circuit in each pixel. The sensing part 111 may sense the electrical characteristics of the pixels through a sensing line SL. Here, the electrical characteristics of the pixels may include a threshold voltage of the driving element and a threshold voltage of the light-emitting element.

The sensing part 111 may be disposed in the data driver 110 together with a digital-to-analog converter (DAC).

The sensing part 111 may sense the electrical characteristics of the light-emitting element and the driving element for each pixel. The sensing part 111 may include an analog-to-digital converter (ADC), a first switch SPRE, and a second switch SAM.

In a display mode, the first switch SPRE connected to a reference voltage line to which a reference voltage Vprer is applied or a third power line 43 is turned on, and the second switch SAM is turned off, so that the reference voltage Vprer may be supplied to the pixel circuit through a sensing line SL.

In a sensing mode after the power-off, the first switch SPRE is turned off, and the second switch SAM connected to the ADC is turned on, so that the current that flows through a channel of the driving element DT, or the threshold voltage of the driving element DT and the operating voltage of the light-emitting element EL may be sensed through the sensing line SL. The current that flows through the sensing line SL may be converted into digital data through the ADC, and the converted digital data may be transferred to the timing controller. The digital data is sensing data including the threshold voltage Vth of the driving element DT and the operating voltage of the light-emitting element. The operating voltage of the light-emitting element may be the threshold voltage of the light-emitting element.

Figure 4:
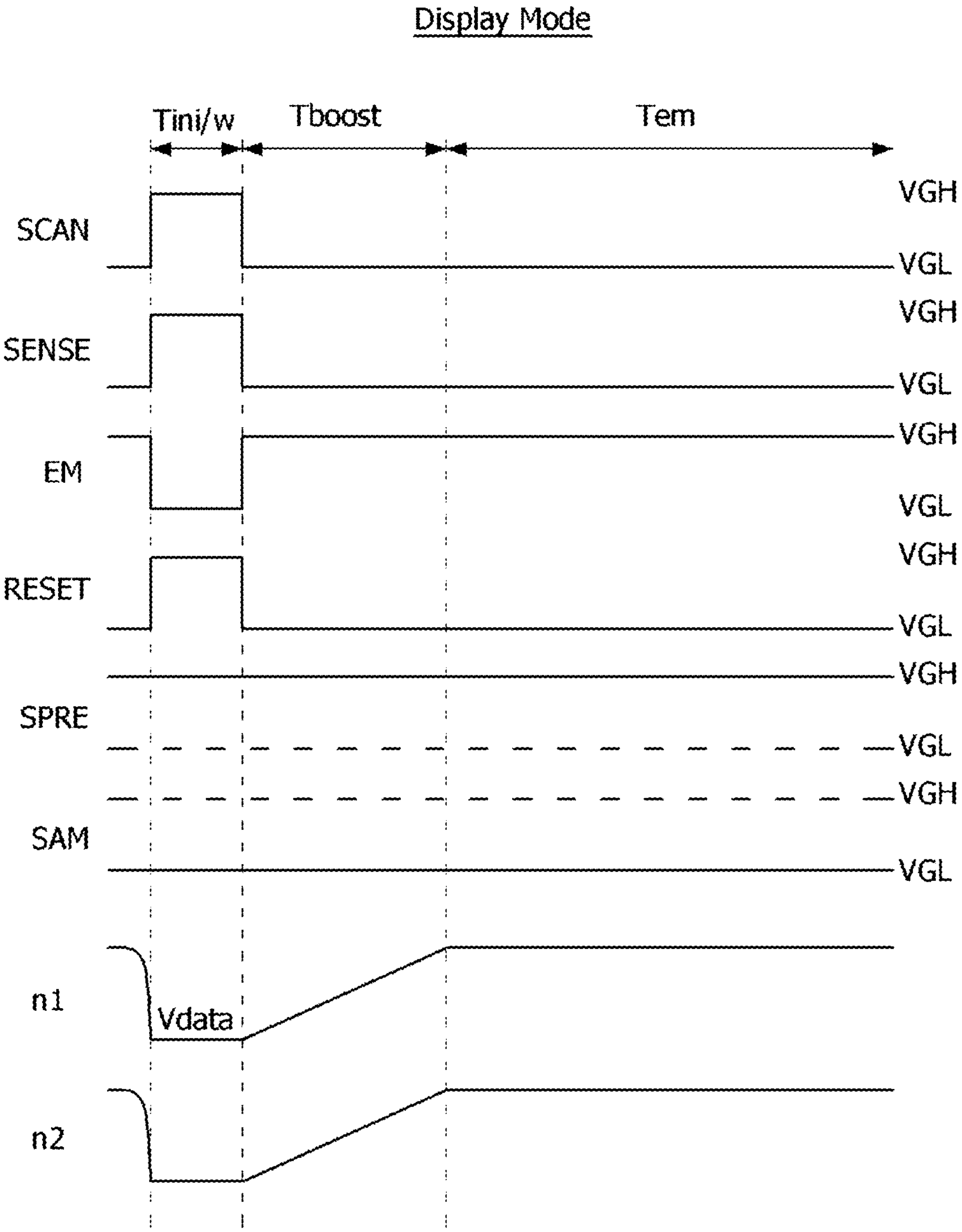
FIG. 4 is a diagram illustrating a display mode driving timing of a pixel circuit illustrated in FIG. 3.
Figure 5A:
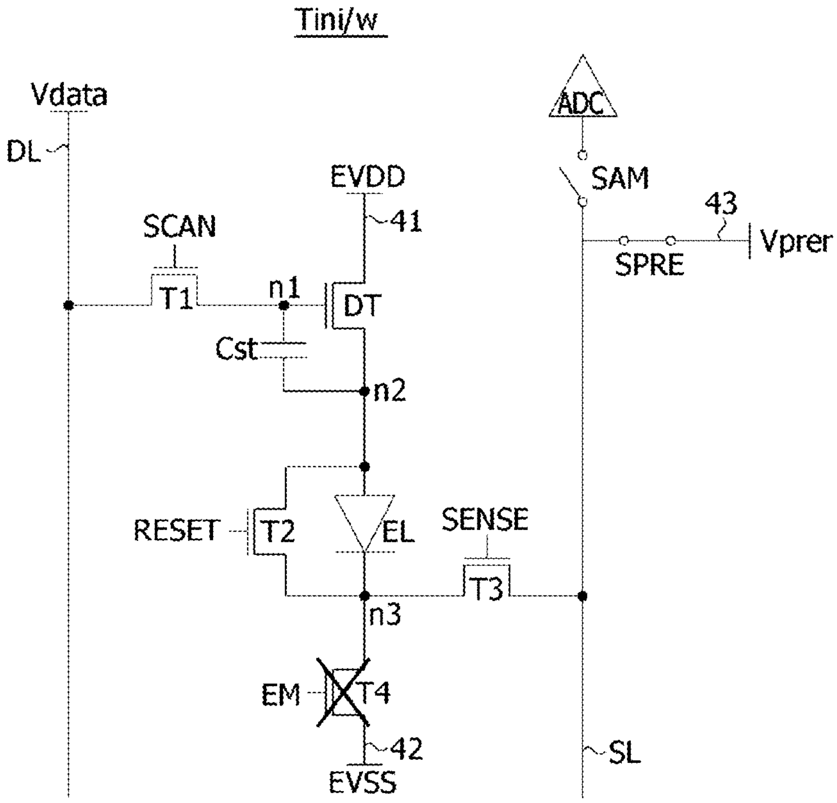
FIGS. 5A to 5C are diagrams explaining an operation of a pixel circuit by FIG. 4.
Figure 5B:
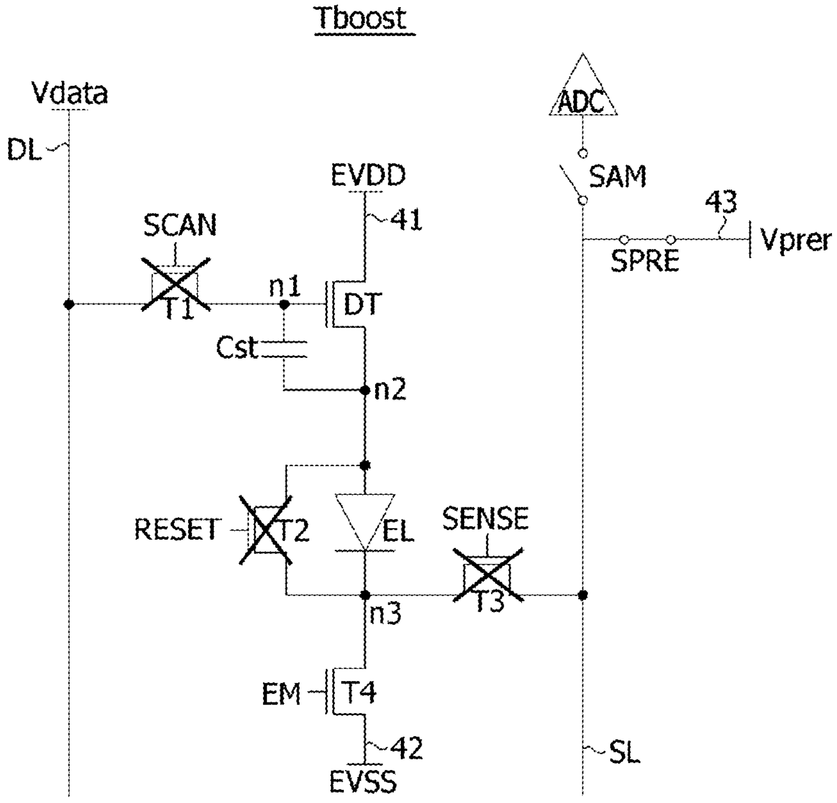
Figure 5C:
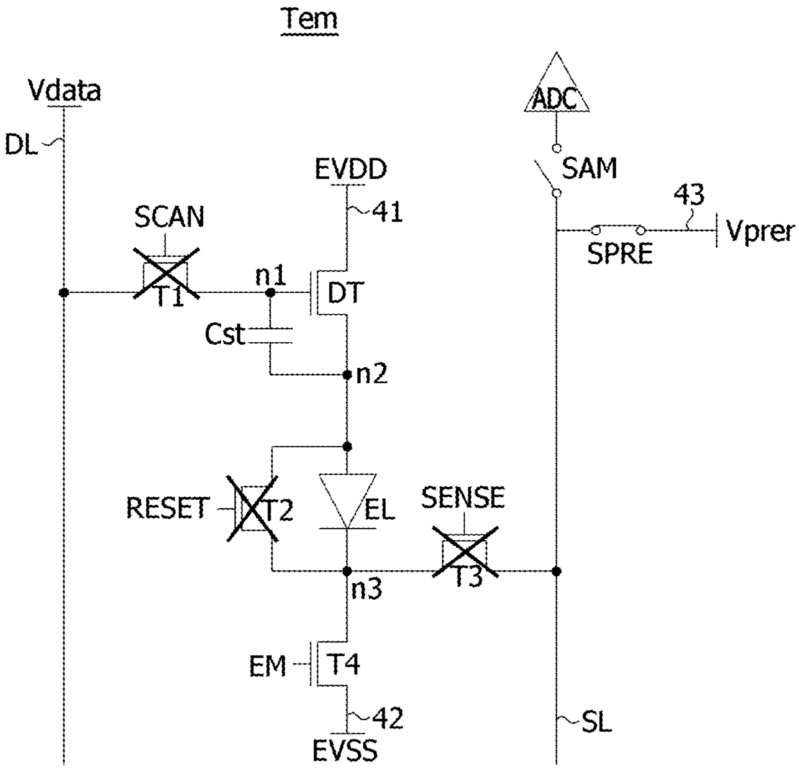

FIG. 4 is a diagram illustrating a display mode driving timing of a pixel circuit illustrated in FIG. 3. FIGS. 5A to 5C are diagrams explaining an operation of a pixel circuit by FIG. 4.

As shown in FIG. 4, in a display mode after the power-on of the display device, the pixel circuit may be driven in the order of an initialization and data writing period Tini/w, a boosting period Tboost, and a light emission period Tem.

In the display mode, the first switch SPRE is on, and the second switch SAM maintains an off state.

As shown in FIGS. 4 and 5A, in the initialization and data writing period Tini/w, the fourth switch element T4 is turned off, and the first to third switch elements T1 to T3 are turned on, so that the data voltage Vdata is supplied to the first node n1, and the second node n2 is initialized to the reference voltage Vprer.

As shown in FIGS. 4 and 5B, in the boosting period Tboost, the first to third switch element T1 to T3 are turned off, and the fourth switch element T4 is turned on, so that the voltage of the first node n1 may be boosted.

As shown in FIGS. 4 and 5C, in the light emission period Tem, the first to third switch elements T1 to T3 are turned off, and the fourth switch element T4 maintains a turn-on state, so that the current may flow through the driving element DT by the pixel driving voltage, and thus the light-emitting element EL may emit light.

Figure 6:
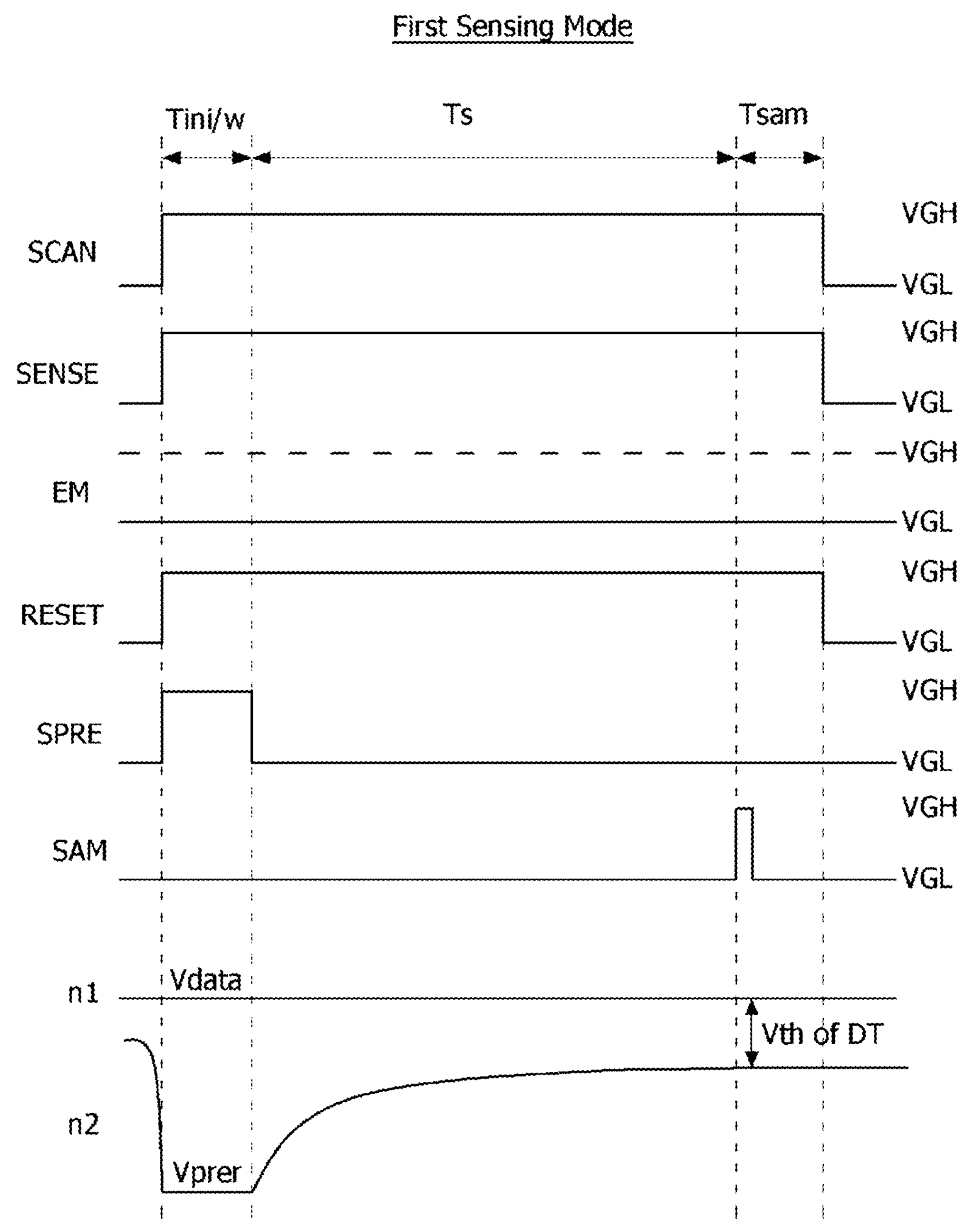
FIG. 6 is a diagram illustrating a first sensing mode driving timing of a pixel circuit illustrated in FIG. 3.
Figure 7A:
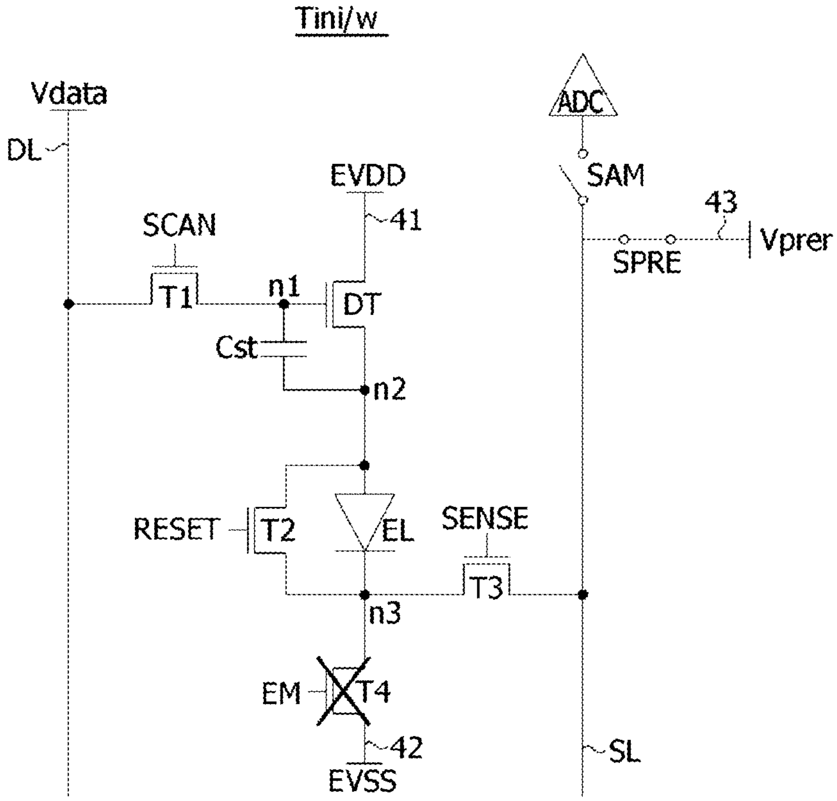
FIGS. 7A to 7C are diagrams explaining an operation of a pixel circuit by FIG. 6.
Figure 7B:
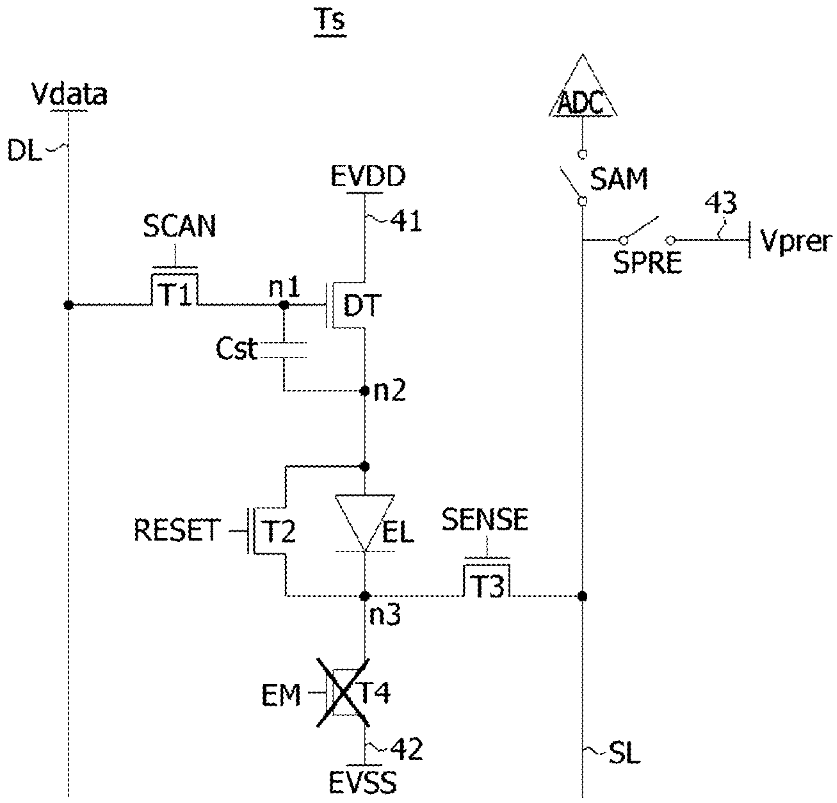
Figure 7C:
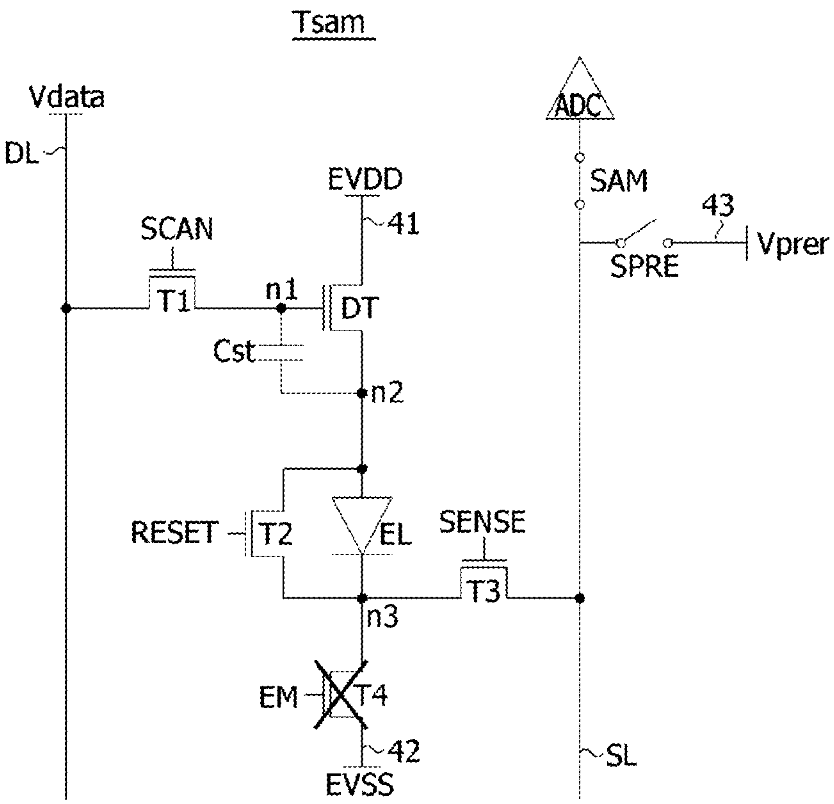

FIG. 6 is a diagram illustrating a first sensing mode driving timing of a pixel circuit illustrated in FIG. 3. FIGS. 7A to 7C are diagrams explaining an operation of a pixel circuit by FIG. 6.

As shown in FIG. 6, in the first sensing mode after the power-off of the display device, the pixel circuit may be driven in the order of an initialization and data writing period Tini/w, a sensing period Ts, and a sampling period Tsam.

In the first sensing mode, the threshold voltage of the driving element DT may be sensed through the sensing line SL.

As shown in FIGS. 6 and 7A, in the initialization and data writing period Tini/w, the second switch SAM is turned off, the first switch SPRE is turned on, the fourth switch element T4 is turned off, and the first to third switch elements T1 to T3 are turned on, so that the data voltage Vdata is supplied to the first node n1, and the reference voltage Vprer is supplied to the second node n2.

As shown in FIGS. 6 and 7B, in the sensing period Ts, the first switch SPRE is switched to a turn-off state, and the supply of the reference voltage Vprer to the second node n2 is blocked. Accordingly, the voltage of the second node n2 rises by the pixel driving voltage EVDD.

As shown in FIGS. 6 and 7C, in the sampling period Tsam, the second switch SAM is switched to a turn-on state, and the threshold voltage of the driving element DT is sampled through the sensing line SL.

The sampled threshold voltage of the driving element DT may be converted into digital data by the ADC in the data driver, and the converted digital data may be transferred to the timing controller.

Figure 8:
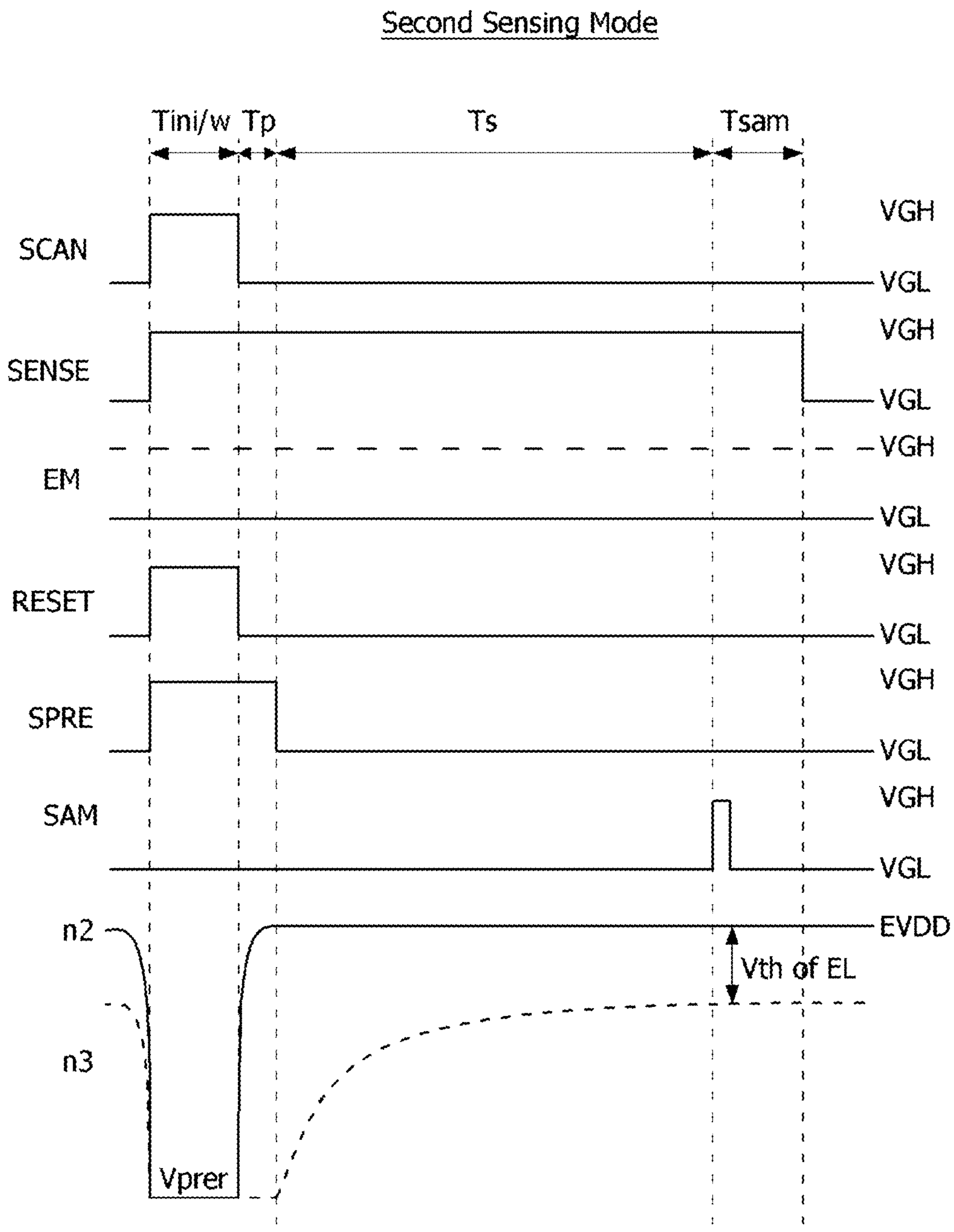
FIG. 8 is a diagram illustrating a second sensing mode driving timing of a pixel circuit illustrated in FIG. 3.

FIG. 8 is a diagram illustrating a second sensing mode driving timing of a pixel circuit illustrated in FIG. 3. FIGS. 9A to 9D are diagrams explaining an operation of a pixel circuit according to FIG. 8.

As shown in FIG. 8, in the second sensing mode after the power-off of the display device, the pixel circuit may be driven in the order of an initialization and data writing period Tini/w, a programming period Tp, a sensing period Ts, and a sampling period Tsam.

In the second sensing mode, the threshold voltage of the light-emitting element EL may be sensed through the sensing line SL.

Figure 9A:
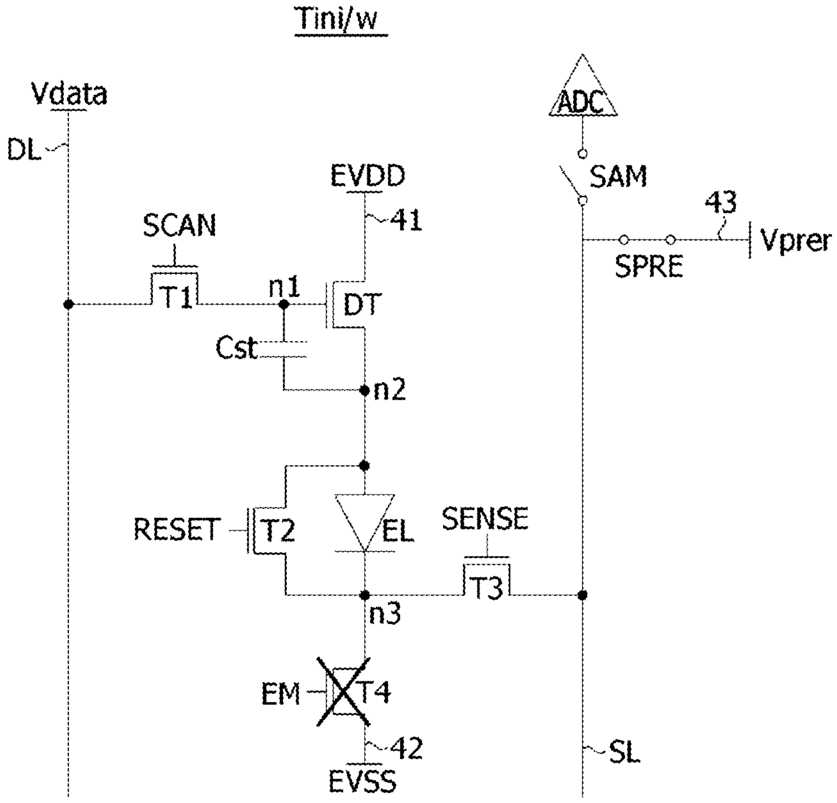
FIGS. 9A to 9D are diagrams explaining an operation of a pixel circuit according to FIG. 8.

As shown in FIGS. 8 and 9A, in the initialization and data writing period Tini/w, the second switch SAM is turned off, the first switch SPRE is turned on, the fourth switch element T4 is turned off, and the first to third switch elements T1 to T3 are turned on, so that the data voltage Vdata is supplied to the first node n1, and the reference voltage Vprer is supplied to the second node n2. In this case, the reference voltage Vprer may be, for example, in the range of 0 to 1 V, but is not necessarily limited thereto. Further, as the data voltage Vdata, a relatively high voltage for using the driving element as a switch element is used. For example, the data voltage Vdata may be about 16 V.

In the second sensing mode, the data voltage Vdata that is applied to the pixel circuit selected for the sensing may be a data voltage of the maximum voltage level or a data voltage generated by using the maximum gamma voltage. The data voltage that is applied to the non-selected pixel circuit may be a data voltage of 0 V or a black grayscale.

Since data voltages of different voltage levels are applied to respective pixel circuits depending on whether to select for sensing, the sensing for each pixel may be possible even if the sensing line is shared.

Figure 9B:
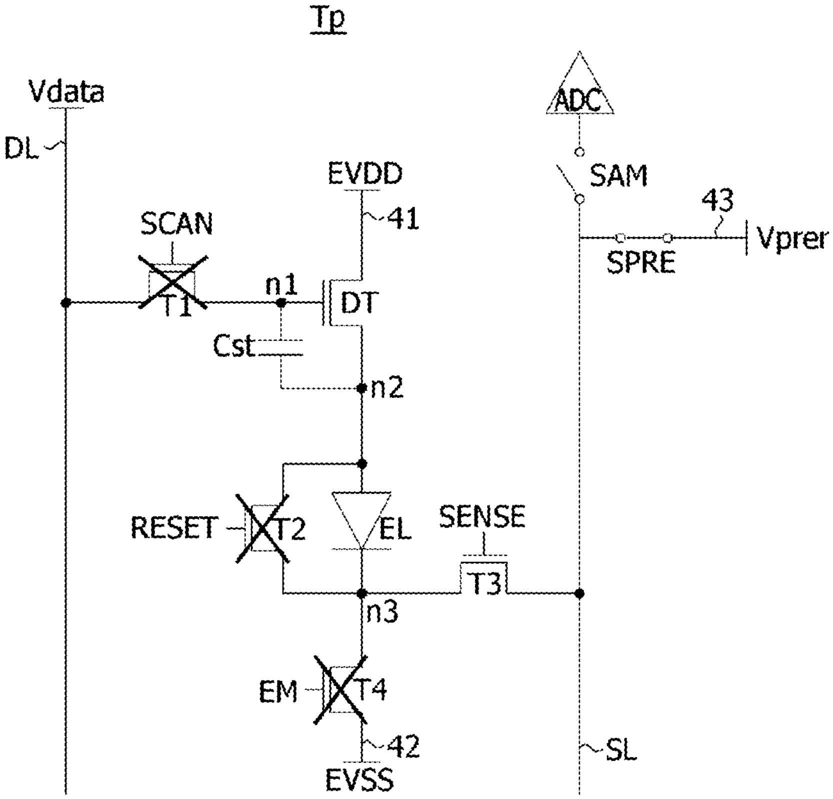

As shown in FIGS. 8 and 9B, in the programming period Tp, the first to second switch elements T1 to T2 and the fourth switch element T4 are turned off, and the third switch element T3 is turned on, so that the light-emitting element EL emits light, the voltage of the second node n2 rises up to the pixel driving voltage EVDD, and the voltage of the third node n3 maintains the reference voltage Vprer.

Figure 9C:
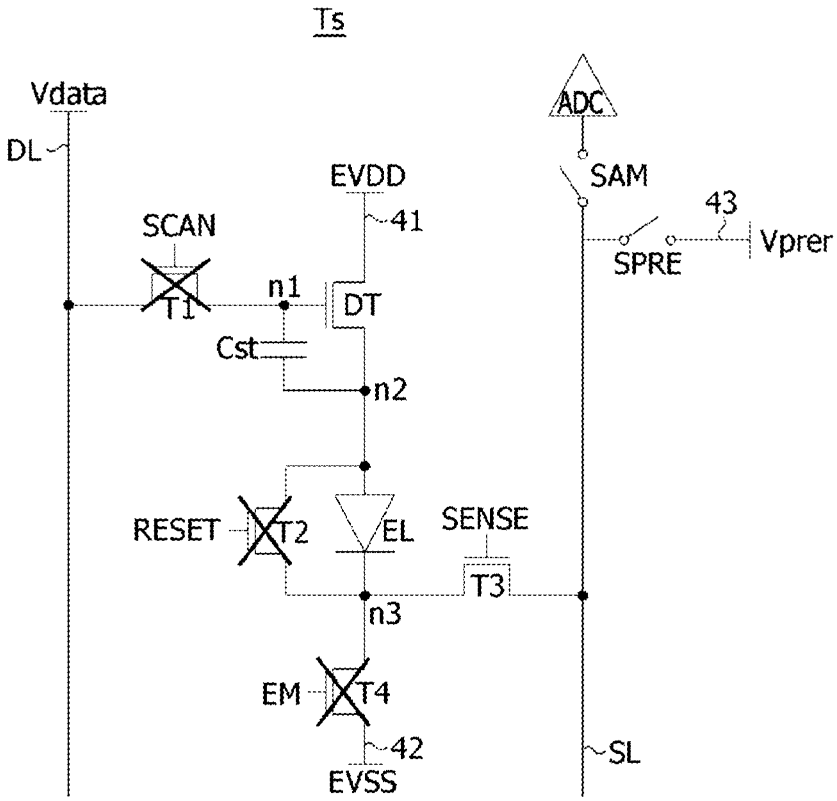

As shown in FIGS. 8 and 9C, in the sensing period Ts, the first switch SPRE is switched to be turned off, the first to second switch elements T1 to T2 and the fourth switch element T4 are turned off, and the third switch element T3 maintains a turn-on state, so that the sensing line becomes in a floating state, and the voltage of the sensing line rises until the light-emitting element emits light and then is turned off.

Figure 9D:
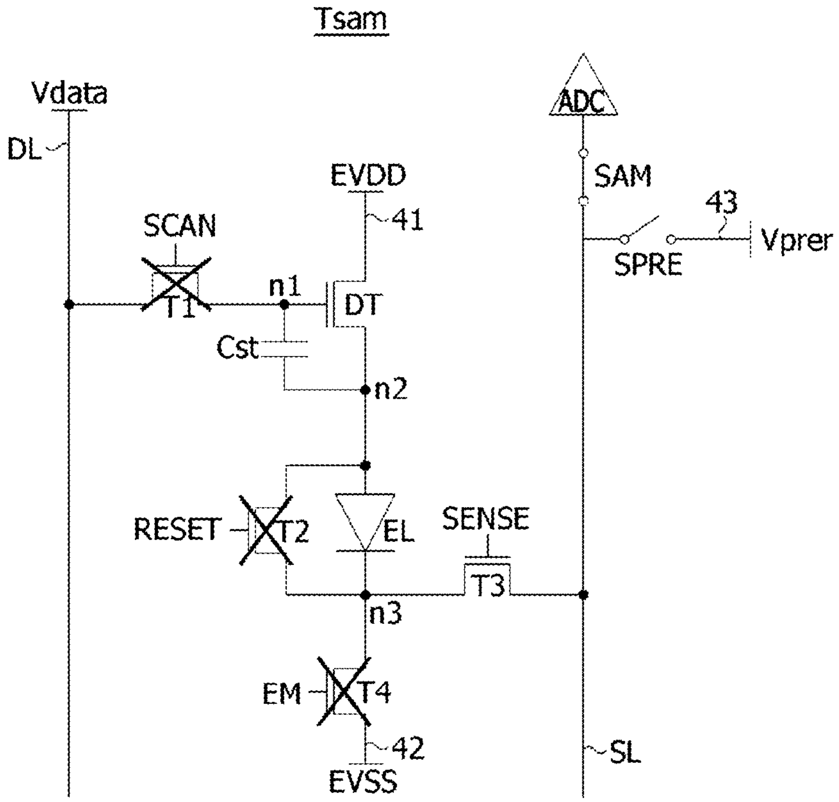

As shown in FIGS. 8 and 9D, in the sampling period Tsam, the second switch SAM is switched to be turned on, and the threshold voltage of the light-emitting element EL is sampled through the sensing line SL.

The sampled threshold voltage of the light-emitting element EL may be converted into digital data by the ADC in the data driver, and the converted digital data may be transferred to the timing controller.

Figure 10:
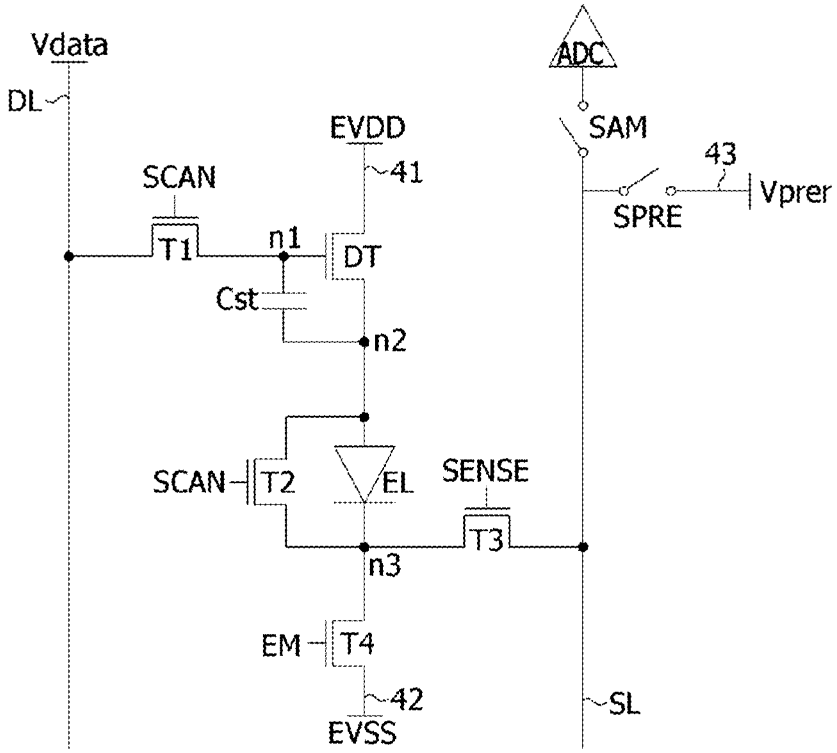
FIG. 10 is a diagram showing a modified pixel circuit of a first embodiment illustrated in FIG. 3.

FIG. 10 is a diagram showing a modified pixel circuit of a first embodiment illustrated in FIG. 3.

As shown in FIG. 10, a modified pixel circuit of the first embodiment includes a light-emitting element EL, a driving element DT that supplies current to the light-emitting element EL, a plurality of switch elements T1 to T4 which switch a current path connected to the driving element DT, and a capacitor Cst that stores a gate-source voltage of the driving element DT.

The pixel circuit of the first embodiment illustrated in FIG. 3 may be configured so that the first gate signal SCAN that is not the reset signal RESET is applied to the gate electrode of the second switch element T2.

In the modified embodiment, since the gate signal being used in another switch element, which is not the reset signal, is used as it is, an additional wiring is not required as compared with the first embodiment, and thus that much space can be secured, and the cost can be saved as well.

Figure 11:
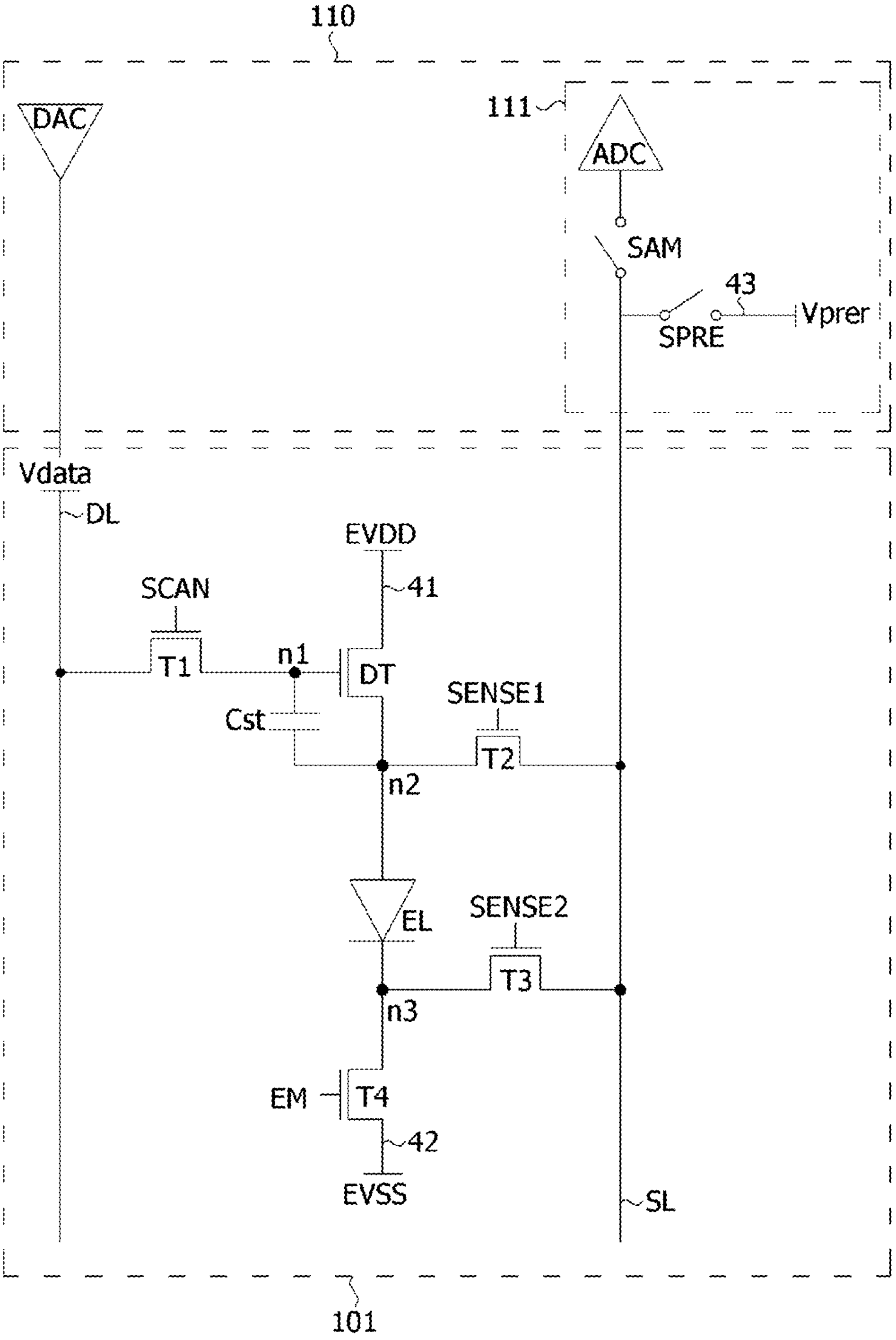
FIG. 11 is a diagram showing a pixel circuit and a compensation circuit according to a second embodiment of the present disclosure.

FIG. 11 is a diagram showing a pixel circuit and a compensation circuit according to a second embodiment of the present disclosure.

As shown in FIG. 11, a pixel circuit according to a second embodiment includes a light-emitting element EL, a driving element DT that supplies current to the light-emitting element EL, a plurality of switch elements T1 to T4 which switch a current path connected to the driving element DT, and a capacitor Cst that stores a gate-source voltage of the driving element DT. The driving element DT and the switch elements T1 to T4 may be implemented as n-channel TFTs, but are not limited thereto.

The light-emitting element EL emits light by current that is applied through a channel of the driving element DT according to the gate-source voltage Vgs of the driving element DT that is changed according to a data voltage Vdata.

The driving element DT drives the light-emitting element EL by supplying current to the light-emitting element EL according to the gate-source voltage Vgs. The driving element DT includes a gate electrode connected to a first node n1, a first electrode (or drain) connected to a pixel driving voltage line to which a pixel driving voltage EVDD is applied or a first power line 41, and a second electrode (or source) connected to a second node n2.

The first switch element T1 is turned on according to a gate-on voltage of a first gate signal SCAN, and connects a data line DL to the first node n1 to supply the data voltage Vdata to the first node n1. The first switch element T1 includes a gate electrode to which the first gate signal SCAN is applied, a first electrode connected to the data line DL, and a second electrode connected to the first node n1.

The second switch element T2 is turned on according to a second gate signal SENSE1, and connects a sensing line SL to the second node n2 to supply a reference voltage Vprer to the second node n2. The second switch element T2 includes a gate electrode to which the second gate signal SENSE1 is applied, a first electrode connected to the second node n2, and a second electrode connected to the sensing line SL.

The third switch element T3 is turned on according to a gate-on voltage of a third gate signal SENSE2, and connects the sensing line SL to the third node n3 to supply a reference voltage to the third node n3. The third switch element T3 includes a gate electrode to which a third gate signal SENSE2 is applied, a first electrode connected to the third node n3, and a second electrode connected to the sensing line SL.

The fourth switch element T4 is turned on according to a gate-on voltage of a fourth gate signal EM, and connects a pixel base voltage line to which a pixel base voltage EVSS is applied or a second power line 42 to the third node n3. The fourth switch element T4 includes a gate electrode to which the fourth gate signal EM is applied, a first electrode connected to the third node n3, and a second electrode connected to the second power line 42.

The capacitor Cst may be connected between the first node n1 and the second node n2. The capacitor Cst may be charged with the gate-source voltage Vgs of the driving element DT.

A compensation circuit may include a sensing part 111 connected to the pixel circuit in each pixel. The sensing part 111 may sense the electrical characteristics of the pixels through the sensing line SL.

The sensing part 111 may be disposed in the data driver 110 together with a DAC.

The sensing part 111 may sense the electrical characteristics of the light-emitting element and the driving element for each pixel. The sensing part 111 may include an analog-to-digital converter (ADC), a first switch SPRE, and a second switch SAM.

In a display mode, the first switch SPRE connected to a reference voltage line to which a reference voltage Vprer is applied or a third power line 43 is turned on, and the second switch SAM is turned off, so that the reference voltage Vprer may be supplied to the pixel circuit through a sensing line SL.

In a sensing mode after the power-off, the first switch SPRE is turned off, and the second switch SAM connected to the ADC is turned on, so that the current that flows through a channel of the driving element DT, or the threshold voltage of the driving element DT and the threshold voltage of the light-emitting element EL may be sensed through the sensing line SL. The current that flows through the sensing line SL may be converted into digital data through the ADC, and the converted digital data may be transferred to the timing controller.

Figure 12:
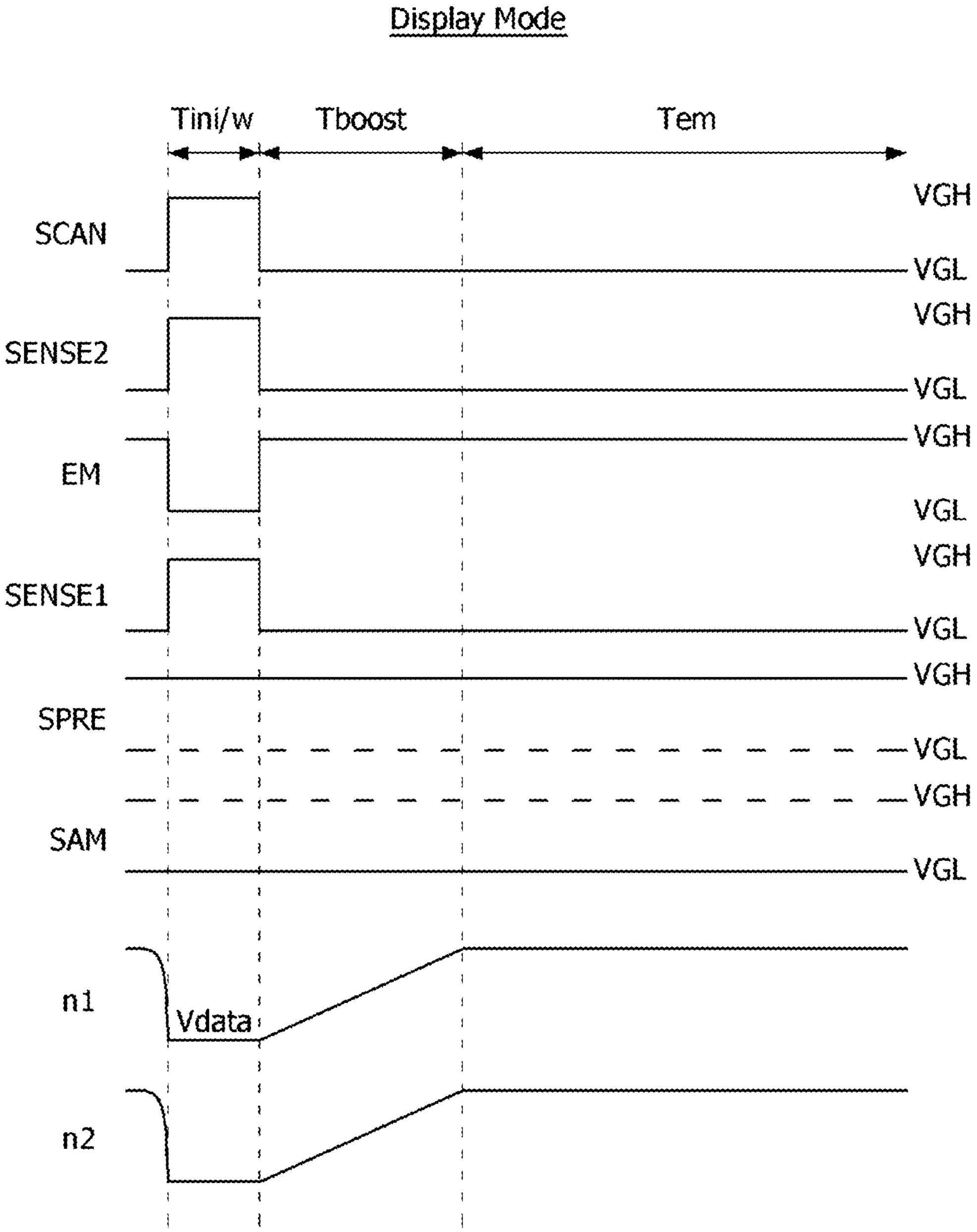
FIG. 12 is a diagram illustrating a display mode driving timing of a pixel circuit illustrated in FIG. 11.
Figure 13A:
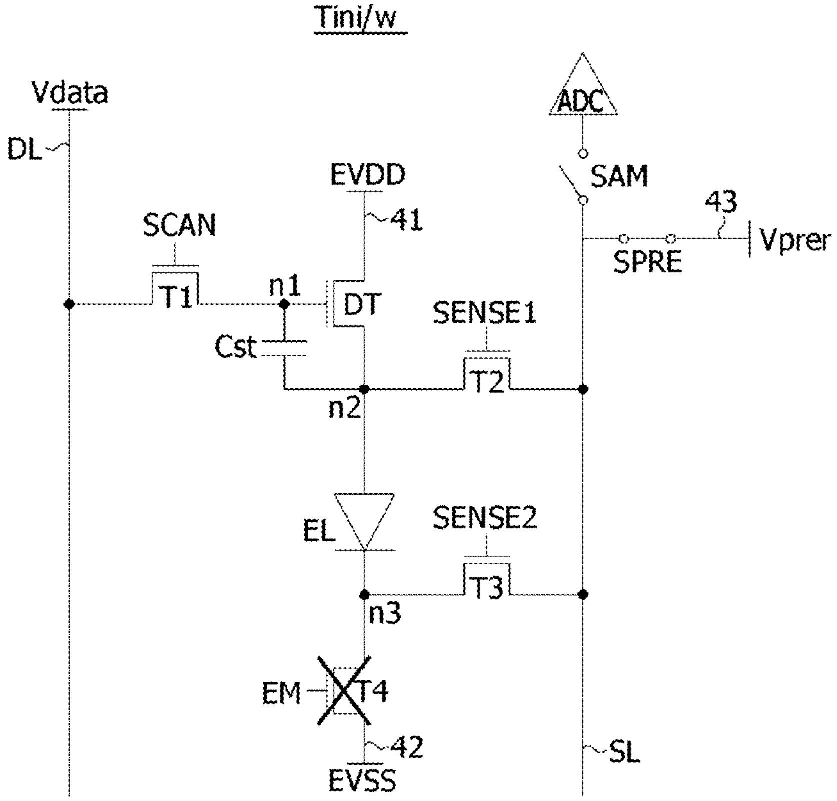
FIGS. 13A to 13C are diagrams explaining an operation of a pixel circuit by FIG. 12.
Figure 13B:
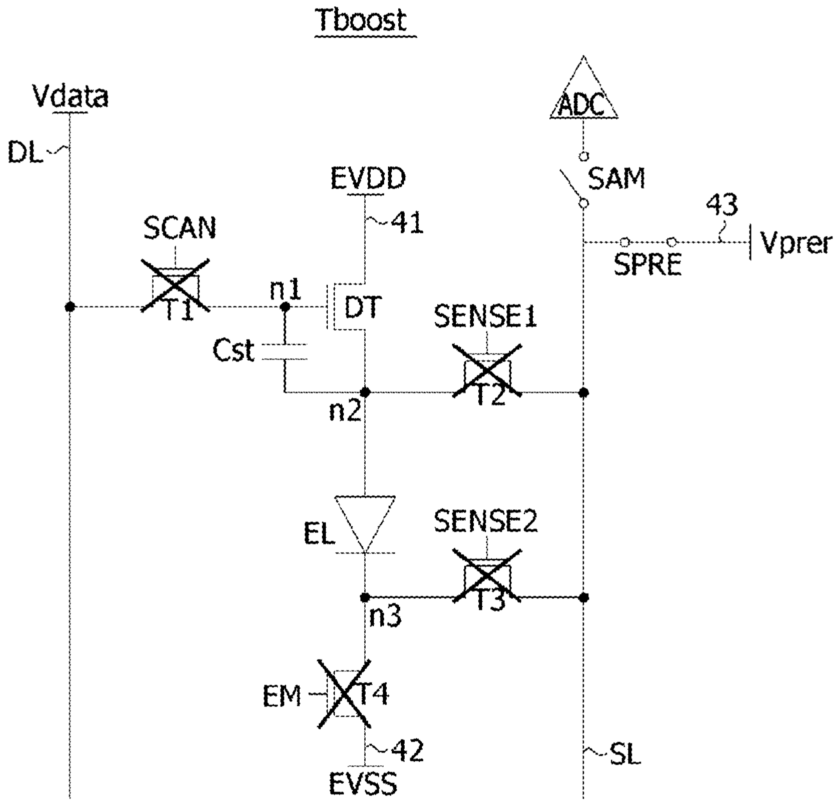
Figure 13C:
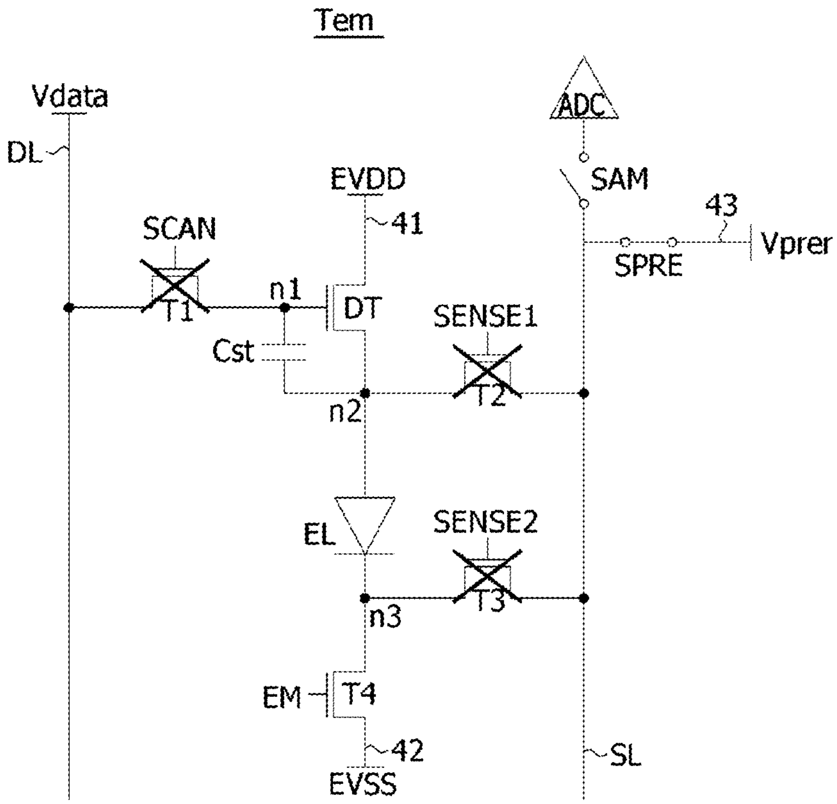

FIG. 12 is a diagram illustrating a display mode driving timing of a pixel circuit illustrated in FIG. 11. FIGS. 13A to 13C are diagrams explaining an operation of a pixel circuit by FIG. 12.

As shown in FIG. 12, in a display mode after the power-on of the display device, the pixel circuit may be driven in the order of an initialization and data writing period Tini/w, a boosting period Tboost, and a light emission period Tem.

In the display mode, the first switch SPRE is on, and the second switch SAM maintains an off state.

As shown in FIGS. 12 and 13A, in the initialization and data writing period Tini/w, the fourth switch element T4 is turned off, and the first to third switch elements T1 to T3 are turned on, so that the data voltage Vdata is supplied to the first node n1, and the second node n2 is initialized to the reference voltage Vprer.

As shown in FIGS. 12 and 13B, in the boosting period Tboost, the first to third switch element T1 to T3 are turned off, and the fourth switch element T4 is turned on, so that the voltage of the first node n1 may be boosted.

As shown in FIGS. 12 and 13C, in the light emission period Tem, the first to third switch elements T1 to T3 are turned off, and the fourth switch element T4 maintains a turn-on state, so that the current may flow through the driving element DT by the pixel driving voltage, and thus the light-emitting element EL may emit light.

Figure 14:
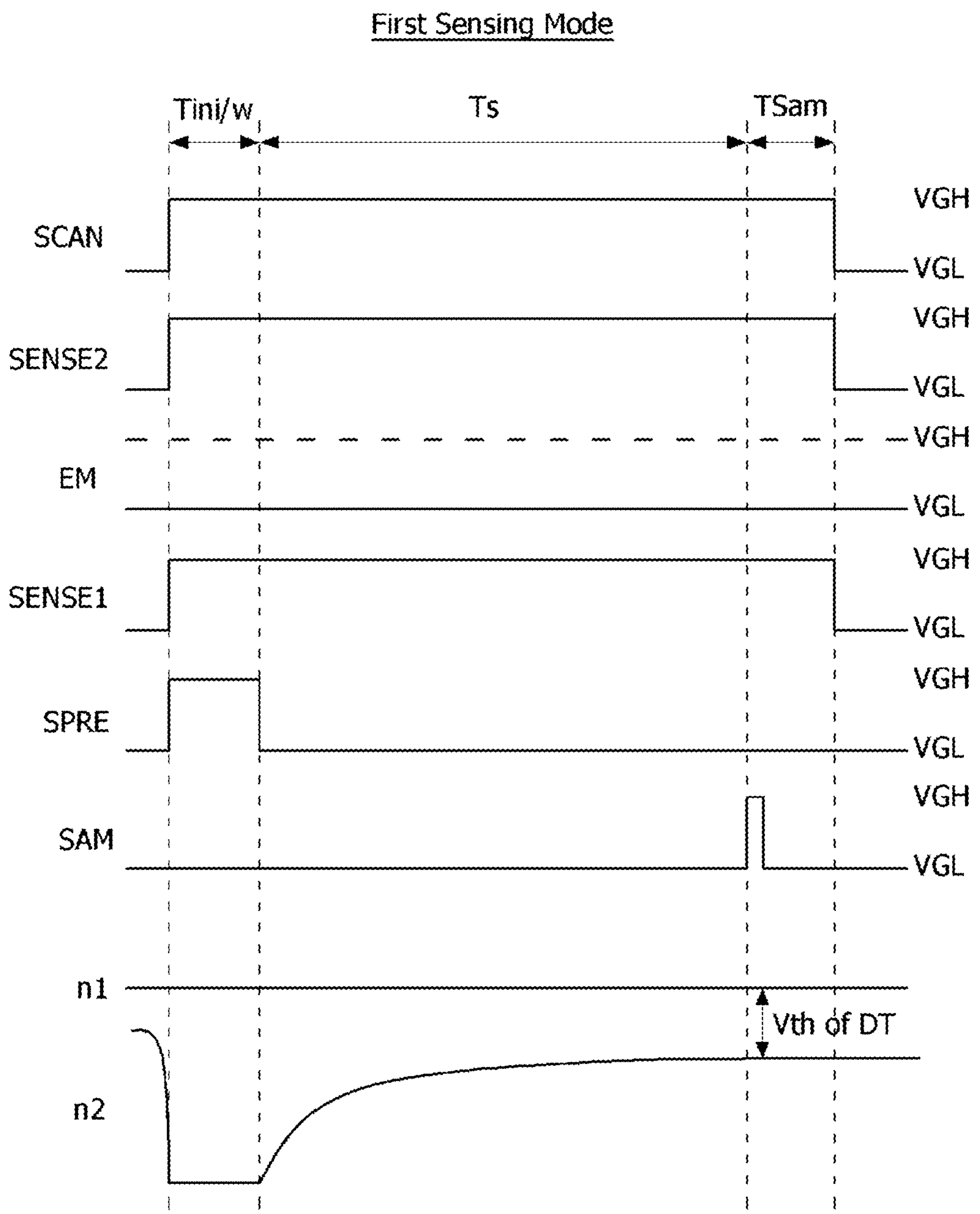
FIG. 14 is a diagram illustrating a first sensing mode driving timing of a pixel circuit illustrated in FIG. 11.
Figure 15A:
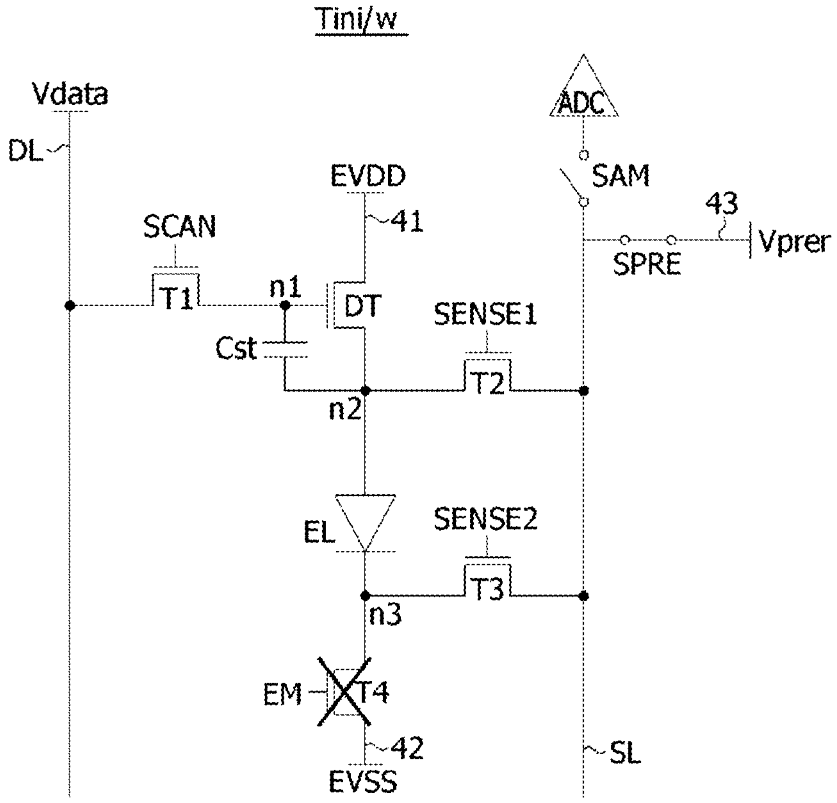
FIGS. 15A to 15C are diagrams explaining an operation of a pixel circuit by FIG. 14.
Figure 15B:
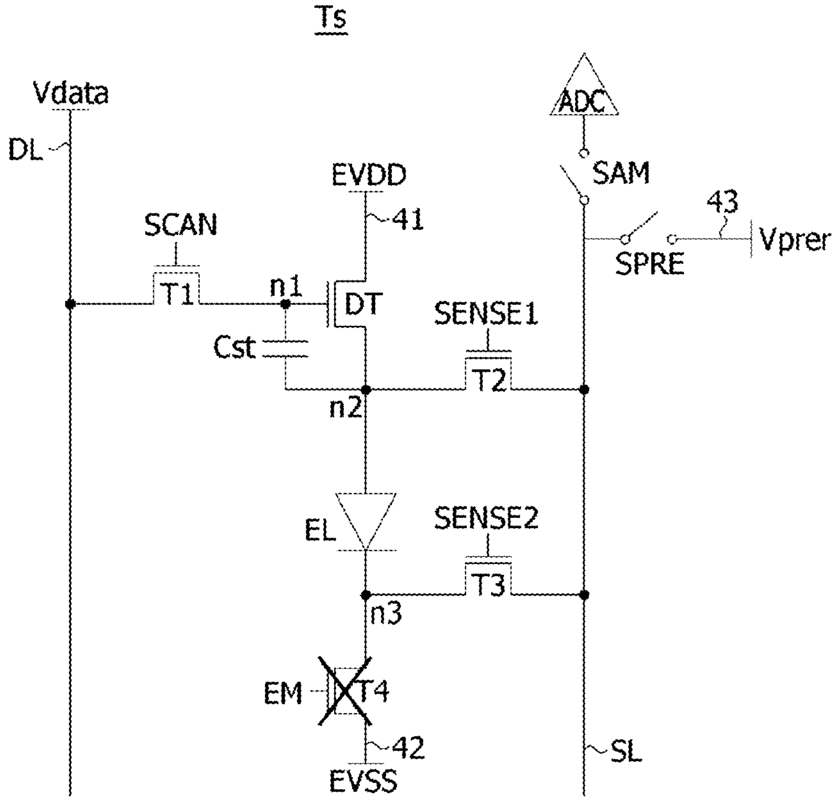
Figure 15C:
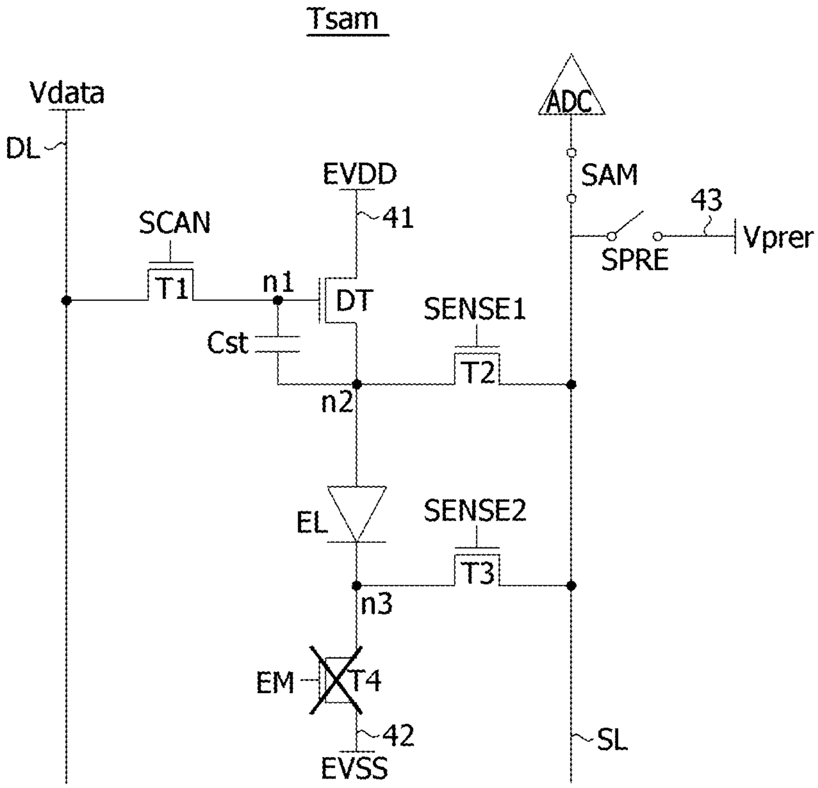

FIG. 14 is a diagram illustrating a first sensing mode driving timing of a pixel circuit illustrated in FIG. 11. FIGS. 15A to 15C are diagrams explaining an operation of a pixel circuit by FIG. 14.

As shown in FIG. 14, in the first sensing mode after the power-off of the display device, the pixel circuit may be driven in the order of an initialization and data writing period Tini/w, a sensing period Ts, and a sampling period Tsam.

In the first sensing mode, the threshold voltage of the driving element DT may be sensed through the sensing line SL.

As shown in FIGS. 14 and 15A, in the initialization and data writing period Tini/w, the second switch SAM is turned off, the first switch SPRE is turned on, the fourth switch element T4 is turned off, and the first to third switch elements T1 to T3 are turned on, so that the data voltage Vdata is supplied to the first node n1, and the reference voltage Vprer is supplied to the second node n2.

As shown in FIGS. 14 and 15B, in the sensing period Ts, the first switch SPRE is switched to a turn-off state, and the supply of the reference voltage Vpref to the second node n2 is blocked. Accordingly, the voltage of the second node n2 rises by the pixel driving voltage EVDD.

As shown in FIGS. 14 and 15C, in the sampling period Tsam, the second switch SAM is switched to a turn-on state, and the threshold voltage of the driving element DT is sampled through the sensing line SL.

The sampled threshold voltage of the driving element DT may be converted into digital data by the ADC in the data driver, and the converted digital data may be transferred to the timing controller.

Figure 16:
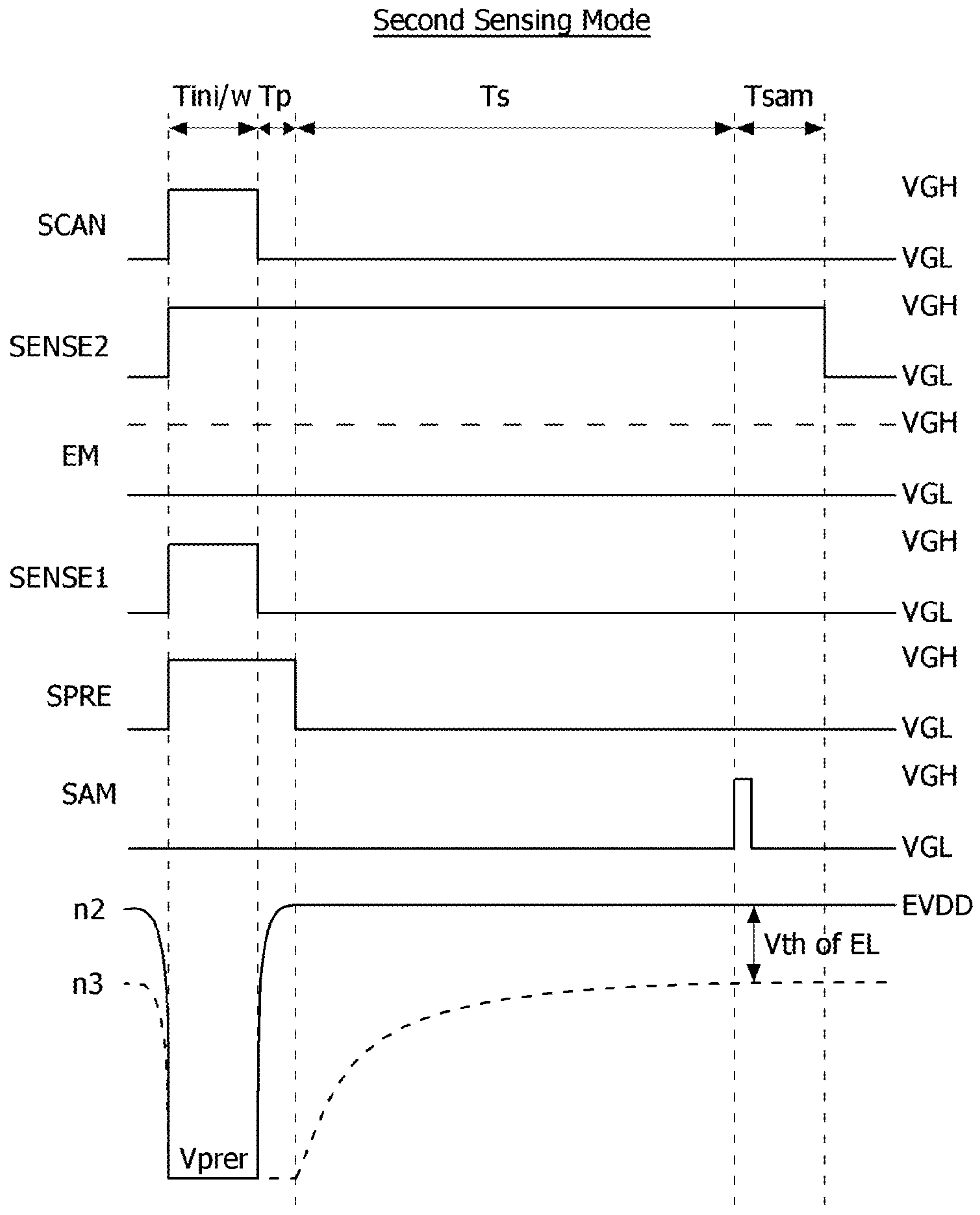
FIG. 16 is a diagram illustrating a second sensing mode driving timing of a pixel circuit illustrated in FIG. 11.

FIG. 16 is a diagram illustrating a second sensing mode driving timing of a pixel circuit illustrated in FIG. 11. FIGS. 17A to 17D are diagrams explaining an operation of a pixel circuit by FIG. 16.

As shown in FIG. 16, in the second sensing mode after the power-off of the display device, the pixel circuit may be driven in the order of an initialization and data writing period Tini/w, a programming period Tp, a sensing period Ts, and a sampling period Tsam.

In the second sensing mode, the threshold voltage of the light-emitting element EL may be sensed through the sensing line SL.

Figure 17A:
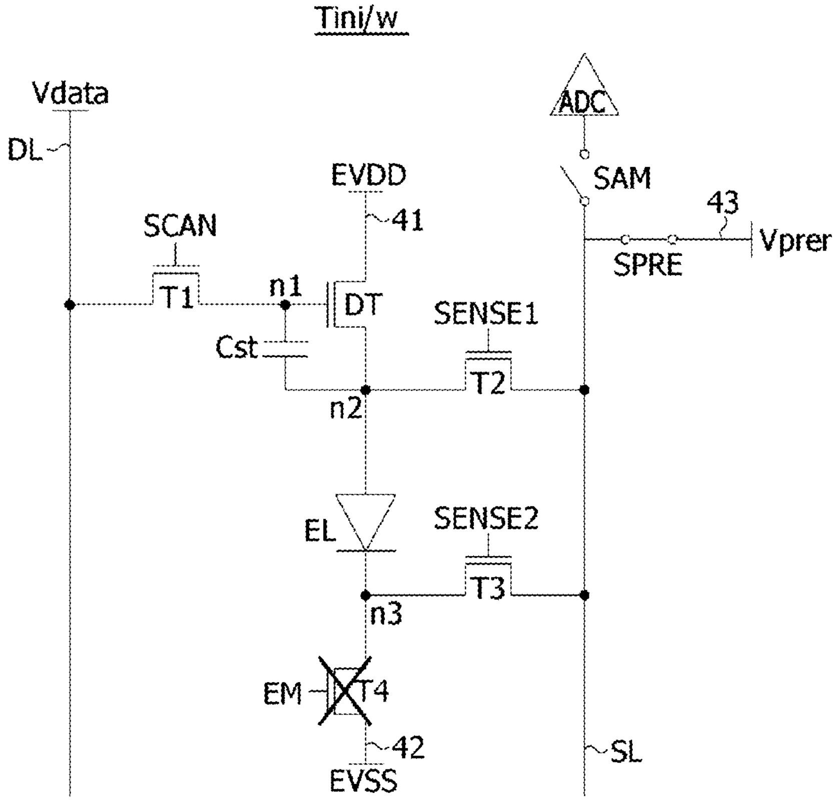
FIGS. 17A to 17D are diagrams explaining an operation of a pixel circuit by FIG. 16.

As shown in FIGS. 16 and 17A, in the initialization and data writing period Tini/w, the second switch SAM is turned off, the first switch SPRE is turned on, the fourth switch element T4 is turned off, and the first to third switch elements T1 to T3 are turned on, so that the data voltage Vdata is supplied to the first node n1, and the reference voltage Vprer is supplied to the second node n2.

In the second sensing mode, the data voltage Vdata that is applied to the pixel circuit selected for the sensing may be a data voltage of the maximum voltage level or a data voltage generated by using the maximum gamma voltage. The data voltage that is applied to the non-selected pixel circuit may be a data voltage of 0 V or a black grayscale.

Figure 17B:
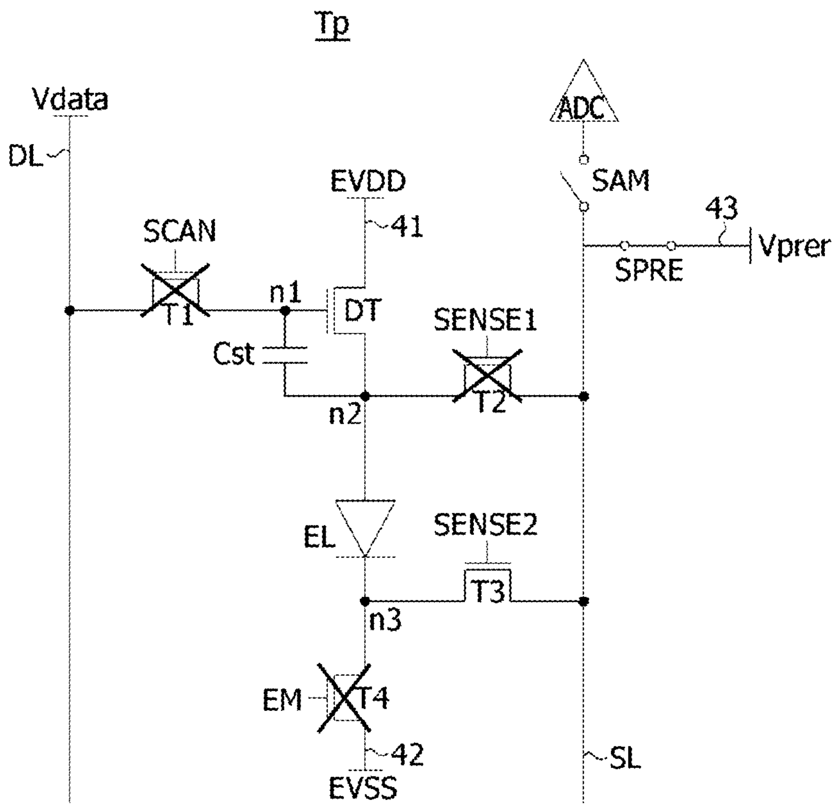

As shown in FIGS. 16 and 17B, in the programming period Tp, the first to second switch elements T1 to T2 and the fourth switch element T4 are turned off, and the third switch element T3 is turned on, so that the light-emitting element EL emits light, the voltage of the second node n2 rises up to the pixel driving voltage EVDD, and the voltage of the third node n3 maintains the reference voltage Vprer.

Figure 17C:
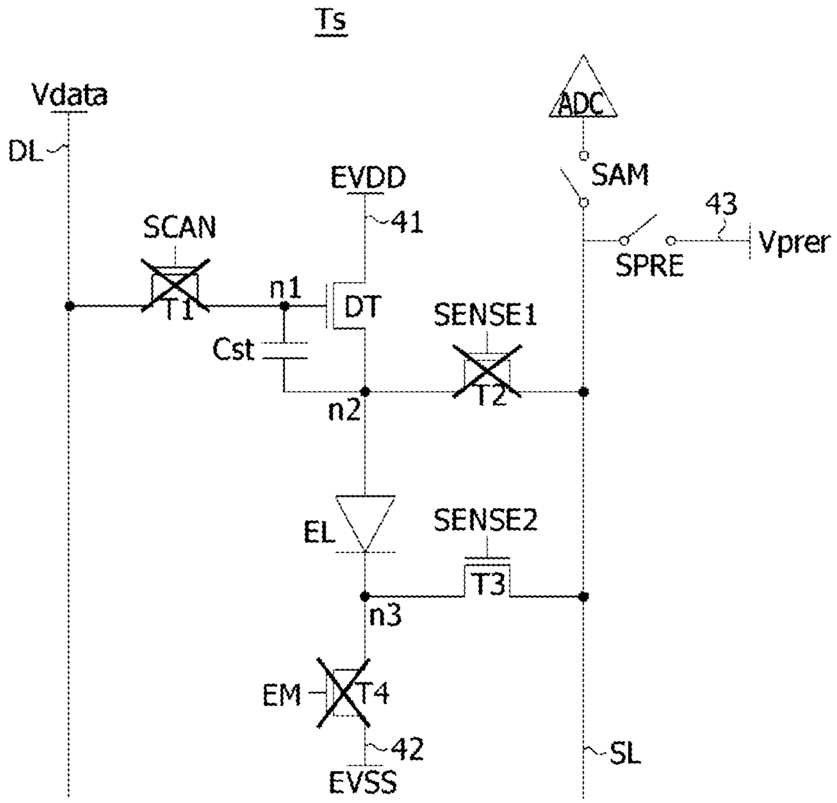

As shown in FIGS. 16 and 17C, in the sensing period Ts, the first switch SPRE is switched to be turned off, the first to second switch elements T1 to T2 and the fourth switch element T4 are turned off, and the third switch element T3 maintains a turn-on state, so that the sensing line becomes in a floating state, and the voltage of the sensing line rises until the light-emitting element emits light and then is turned off.

Figure 17D:
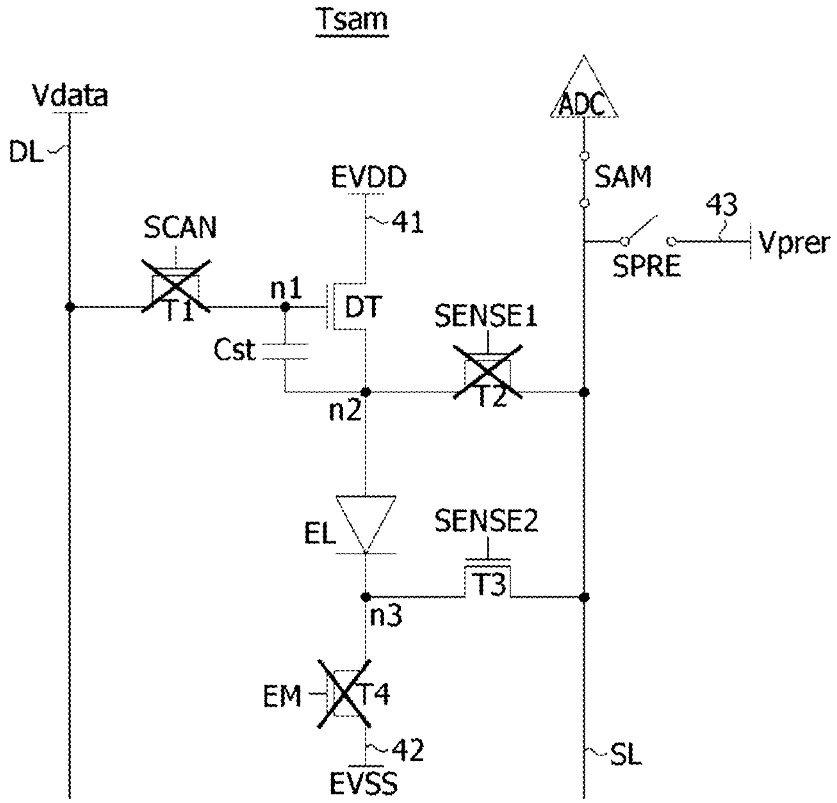

As shown in FIGS. 16 and 17D, in the sampling period Tsam, the second switch SAM is switched to be turned on, and the threshold voltage of the light-emitting element EL is sampled through the sensing line SL.

The sampled threshold voltage of the light-emitting element EL may be converted into digital data by the ADC in the data driver, and the converted digital data may be transferred to the timing controller.

Figure 18:
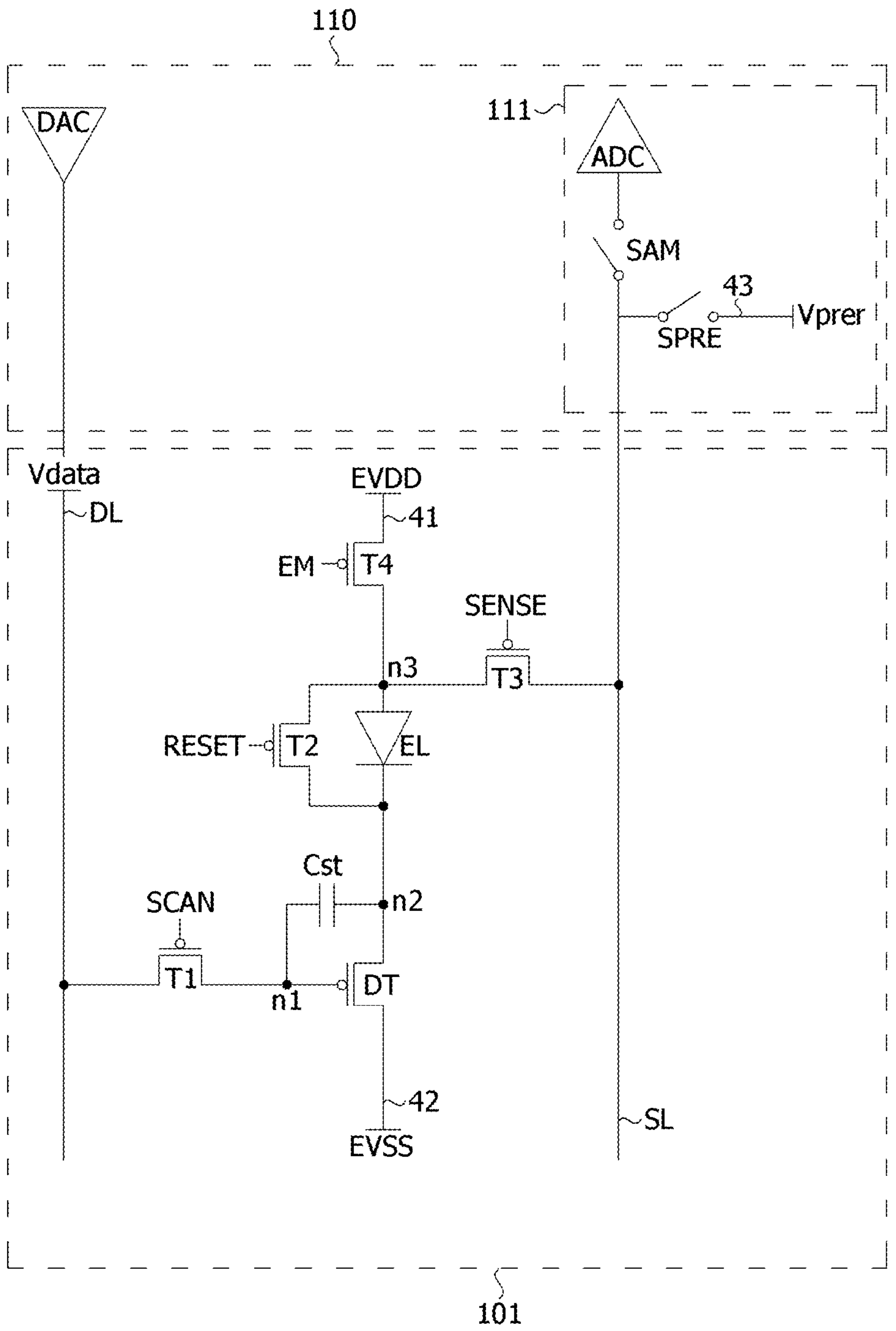
FIG. 18 is a diagram showing a pixel circuit and a compensation circuit according to a third embodiment of the present disclosure.
Figure 19A:
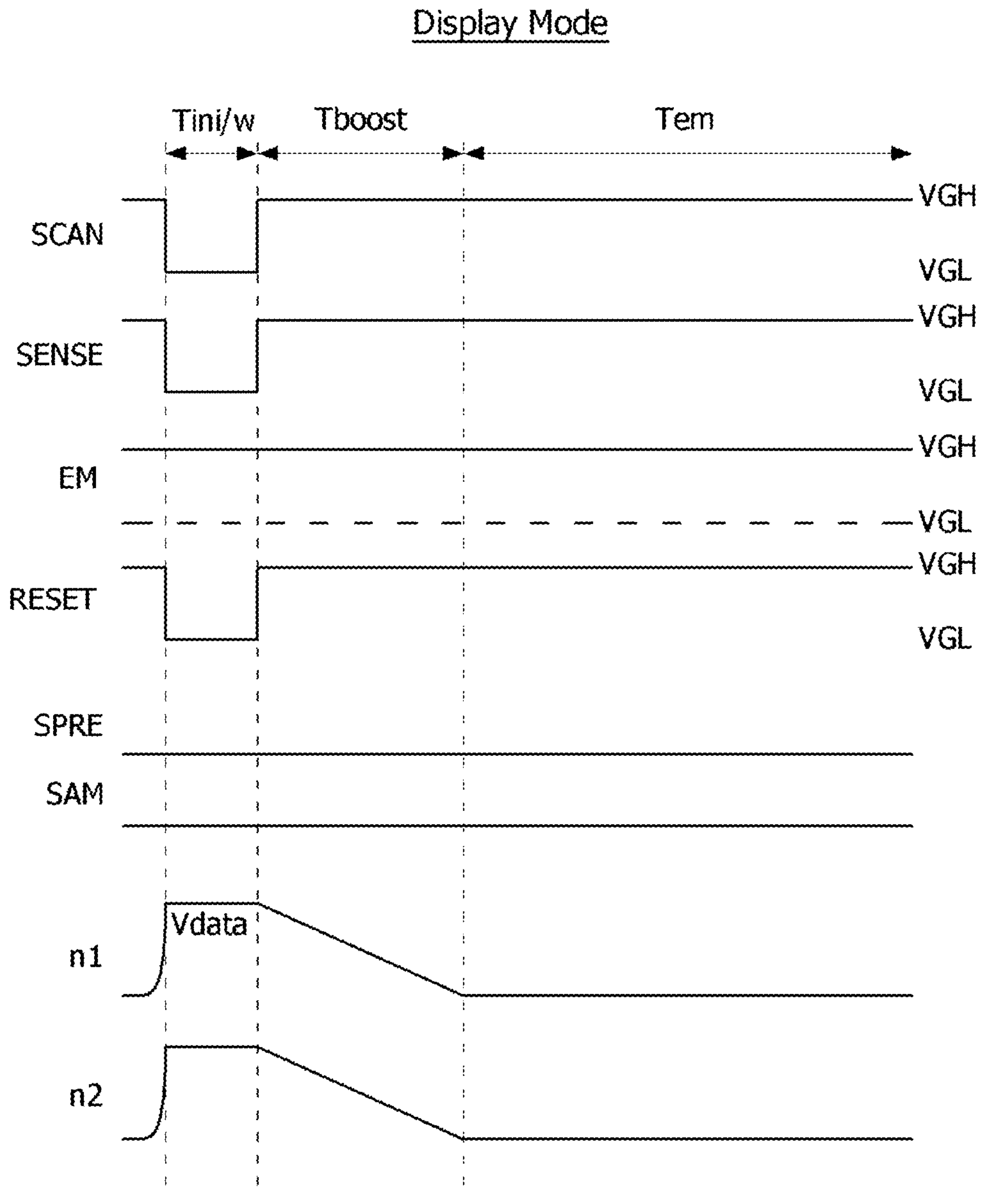
FIGS. 19A to 19C are diagrams explaining an operation for each mode of a pixel circuit illustrated in FIG. 18.
Figure 19B:
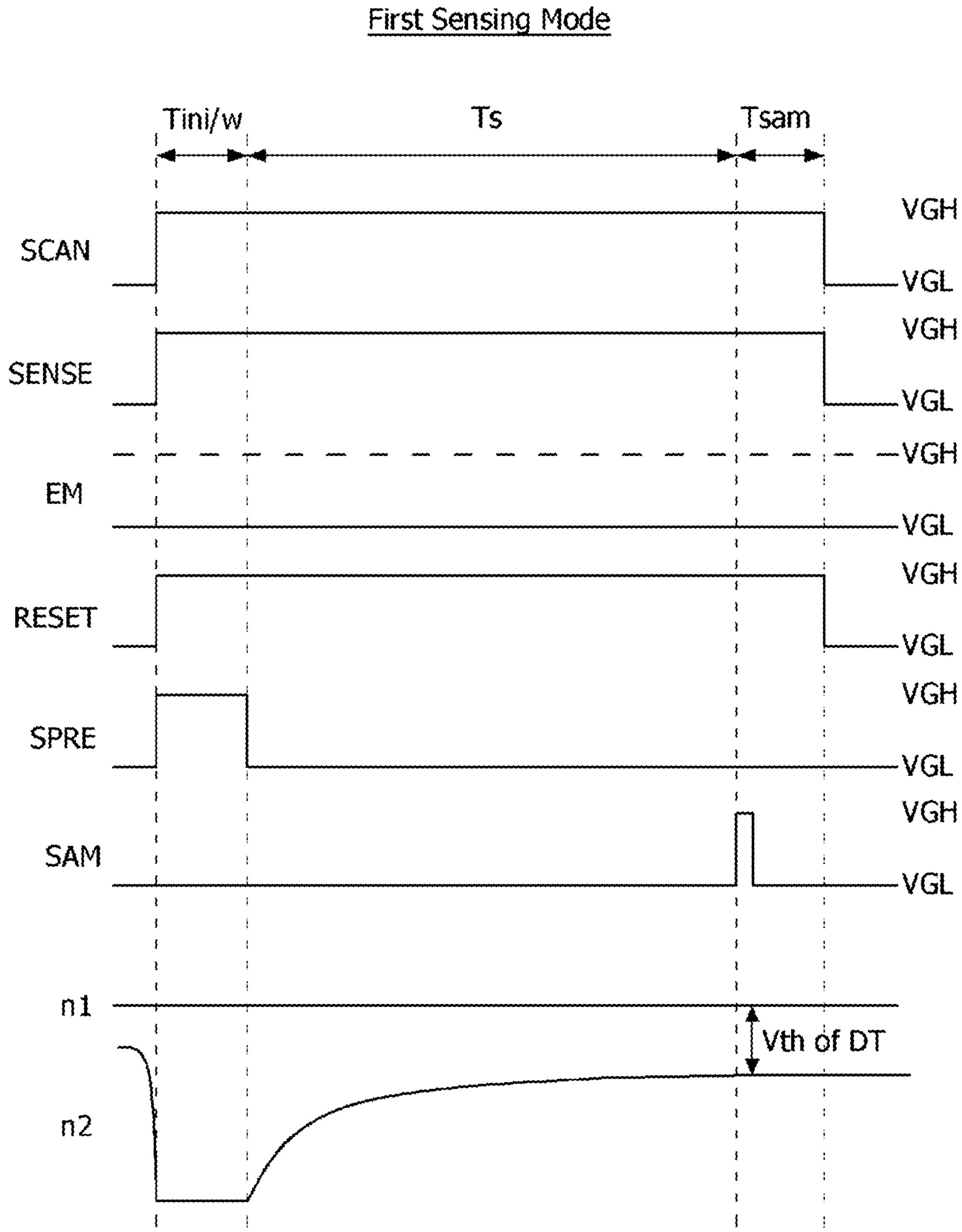
Figure 19C:
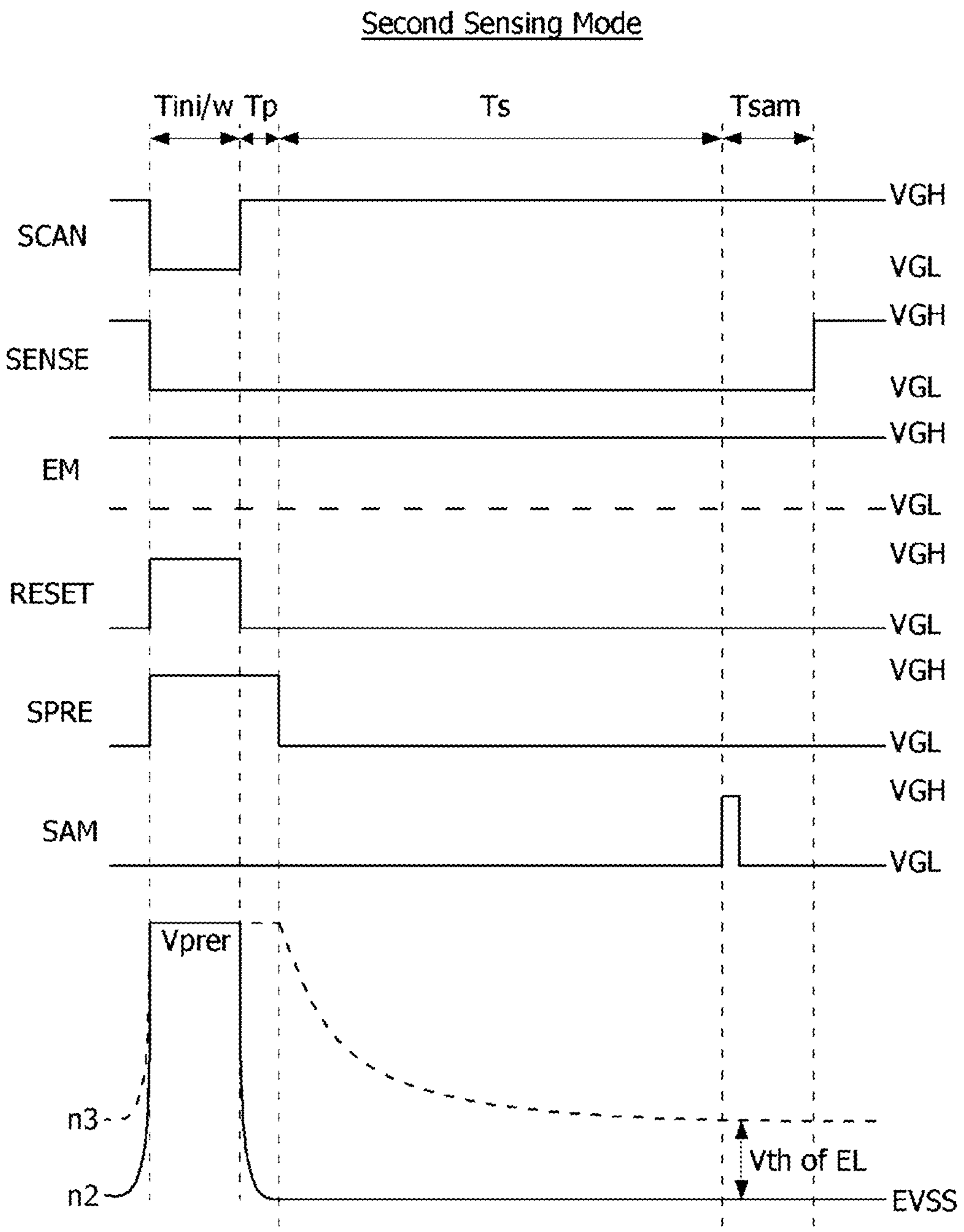

FIG. 18 is a diagram showing a pixel circuit and a compensation circuit according to a third embodiment of the present disclosure. FIGS. 19A to 19C are diagrams explaining an operation for each mode of a pixel circuit illustrated in FIG. 18.

As shown in FIG. 18, a pixel circuit according to the third embodiment includes a light-emitting element EL, a driving element DT that supplies current to the light-emitting element EL, a plurality of switch elements T1 to T4 which switch a current path connected to the driving element DT, and a capacitor Cst that stores a gate-source voltage of the driving element DT. The driving element DT and the switch elements T1 to T4 may be implemented as p-channel TFTs, but are not limited thereto.

The light-emitting element EL emits light by current that is applied through a channel of the driving element DT according to the gate-source voltage Vgs of the driving element DT that is changed according to the data voltage Vdata.

The driving element DT drives the light-emitting element EL by supplying the current to the light-emitting element EL according to the gate-source voltage Vgs. The driving element DT includes a gate electrode connected to the first node n1, a first electrode (or source) connected to the second node n2, and a second electrode (or drain) connected to a pixel base voltage line to which a pixel base voltage EVSS is applied or a second power line 42.

The first switch element T1 is turned on according to the gate-on voltage of the first gate signal SCAN, and connects the data line DL to the first node n1 to supply the data voltage Vdata to the first node n1. The first switch element T1 includes a gate electrode to which the first gate signal SCAN is applied, a first electrode connected to the data line DL, and a second electrode connected to the first node n1.

The second switch element T2 is turned on according to a reset signal RESET, and connects the second node n2 to the third node n3. The second switch element T2 includes a gate electrode to which the reset signal RESET is applied, a first electrode connected to the third node n3, and a second electrode connected to the second node n2.

The third switch element T3 is turned on according to a gate-on voltage of a second gate signal SENSE, and connects the sensing line SL to the third node n3 to supply the reference voltage Vprer to the third node n3. The third switch element T3 includes a gate electrode to which the second gate signal SENSE is applied, a first electrode connected to the third node n3, and a second electrode connected to the sensing line SL.

The fourth switch element T4 is turned on according to a gate-on voltage of a third gate signal EM, and connects a pixel driving voltage line to which a pixel driving voltage EVDD is applied or a first power line 41 to the third node n3. The fourth switch element T4 includes a gate electrode to which the third gate signal EM is applied, a first electrode connected to the first power line 41, and a second electrode connected to the third node n3.

The capacitor Cst may be connected between the first node n1 and the second node n2. The capacitor Cst may be charged with the gate-source voltage Vgs of the driving element DT.

A compensation circuit may include a sensing part 111 connected to the pixel circuit in each pixel. The sensing part 111 may sense the electrical characteristics of the pixels through the sensing line SL.

The sensing part 111 may be disposed in the data driver 110 together with a DAC.

The sensing part 111 may sense the electrical characteristics of the light-emitting element and the driving element for each pixel. The sensing part 111 may include an analog-to-digital converter (ADC), a first switch SPRE, and a second switch SAM.

In a display mode, the first switch SPRE connected to the reference voltage line to which the reference voltage Vprer is applied or a third power line 43 is turned on, and the second switch SAM is turned off, so that the reference voltage Vprer may be supplied to the pixel circuit through the sensing line SL.

In a sensing mode after the power-off, the first switch SPRE is turned off, and the second switch SAM connected to the ADC is turned off, so that the current that flows through a channel of the driving element DT, or the threshold voltage of the driving element DT and the operating voltage of the light-emitting element EL may be sensed through the sensing line SL. The current that flows through the sensing line SL may be converted into digital data through the ADC, and the converted digital data may be transferred to the timing controller.

Since the pixel circuit according to the third embodiment is driven with the same constitution and the same operating mechanism as those of the pixel circuit according to the first embodiment although the only difference is that it is implemented with the p-channel TFTs, the detailed explanation of the driving method will be omitted.

As shown in FIG. 19A, in the display mode after the power-on of the display device, the pixel circuit may be driven in the order of an initialization and data writing period Tini/w, a boosting period Tboost, and a light emission period Tem, and thus the light-emitting element EL may emit light to display an image on the screen.

As shown in FIG. 19B, in the first sensing mode after the power-off of the display device, the pixel circuit may be driven in the order of an initialization and data writing period Tini/w, a sensing period Ts, and a sampling period Tsam, and the threshold voltage of the driving element DT may be sensed through the sensing line SL.

As shown in FIG. 19C, in the second sensing mode after the power-off of the display device, the pixel circuit may be driven in the order of an initialization and data writing period Tini/w, a programming period Tp, a sensing period Ts, and a sampling period Tsam, and the threshold voltage of the light-emitting element EL may be sensed through the sensing line SL.

Figure 20:
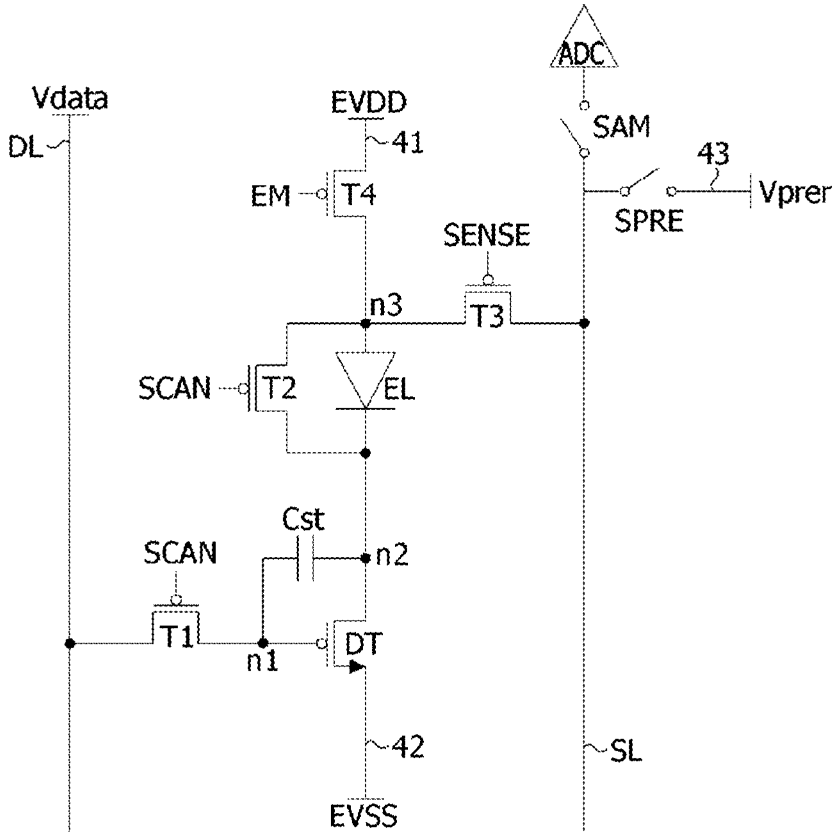
FIG. 20 is a diagram showing a modified pixel circuit of a third embodiment illustrated in FIG. 18.

FIG. 20 is a diagram showing a modified pixel circuit of a third embodiment illustrated in FIG. 18.

As shown in FIG. 20, a modified pixel circuit of the third embodiment includes a light-emitting element EL, a driving element DT that supplies current to the light-emitting element EL, a plurality of switch elements T1 to T4 which switch a current path connected to the driving element DT, and a capacitor Cst that stores a gate-source voltage of the driving element DT.

The modified pixel circuit of the third embodiment illustrated in FIG. 20 may be configured so that the first gate signal SCAN that is not the reset signal RESET is applied to the gate electrode of the second switch element T2.

In the modified embodiment, since the gate signal being used in another switch element, which is not the reset signal, is used as it is, an additional wiring is not required as compared with the third embodiment, and thus that much space can be secured, and the cost can be saved as well.

Figure 21:
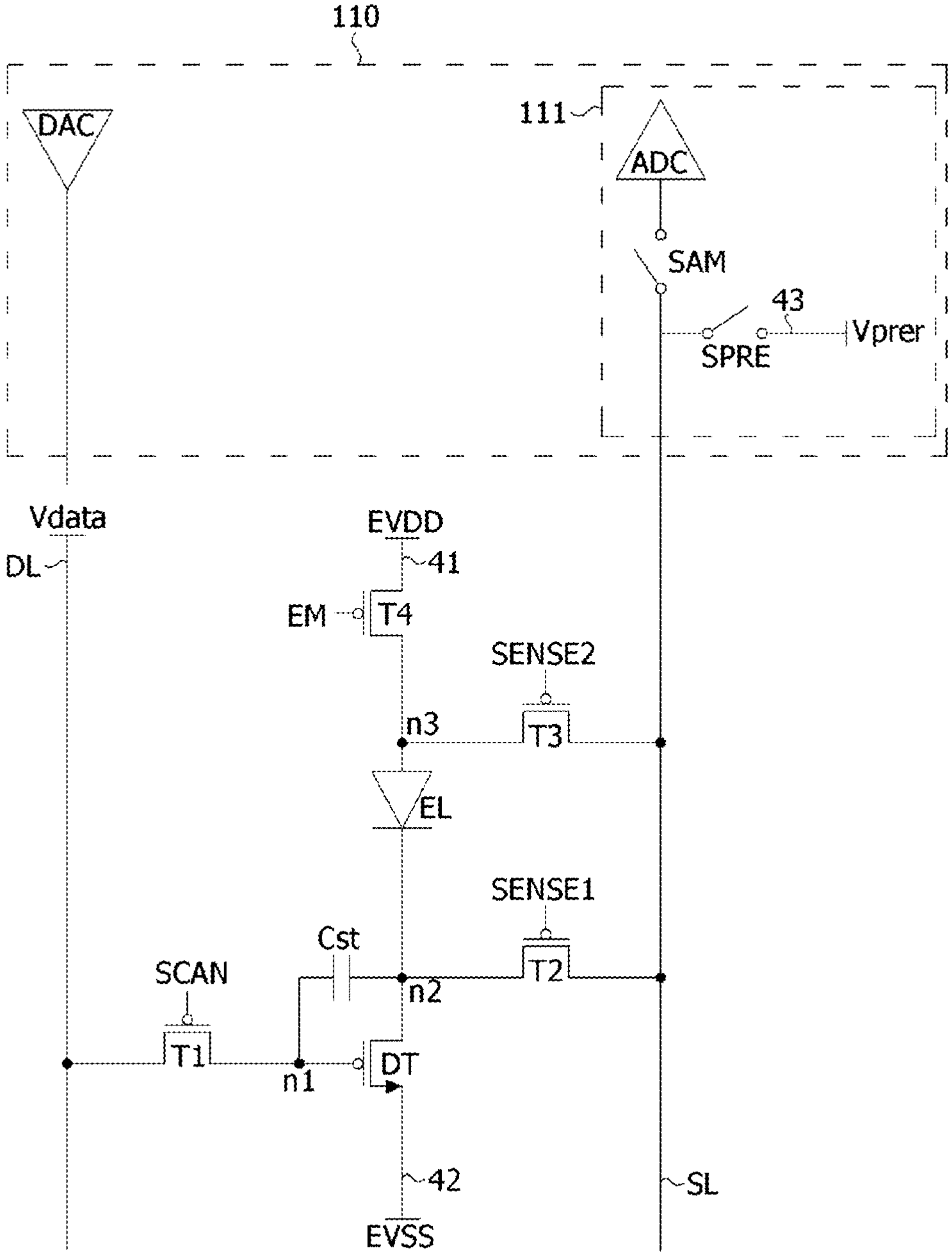
FIG. 21 is a diagram showing a pixel circuit and a compensation circuit according to a fourth embodiment of the present disclosure.
Figure 22A:
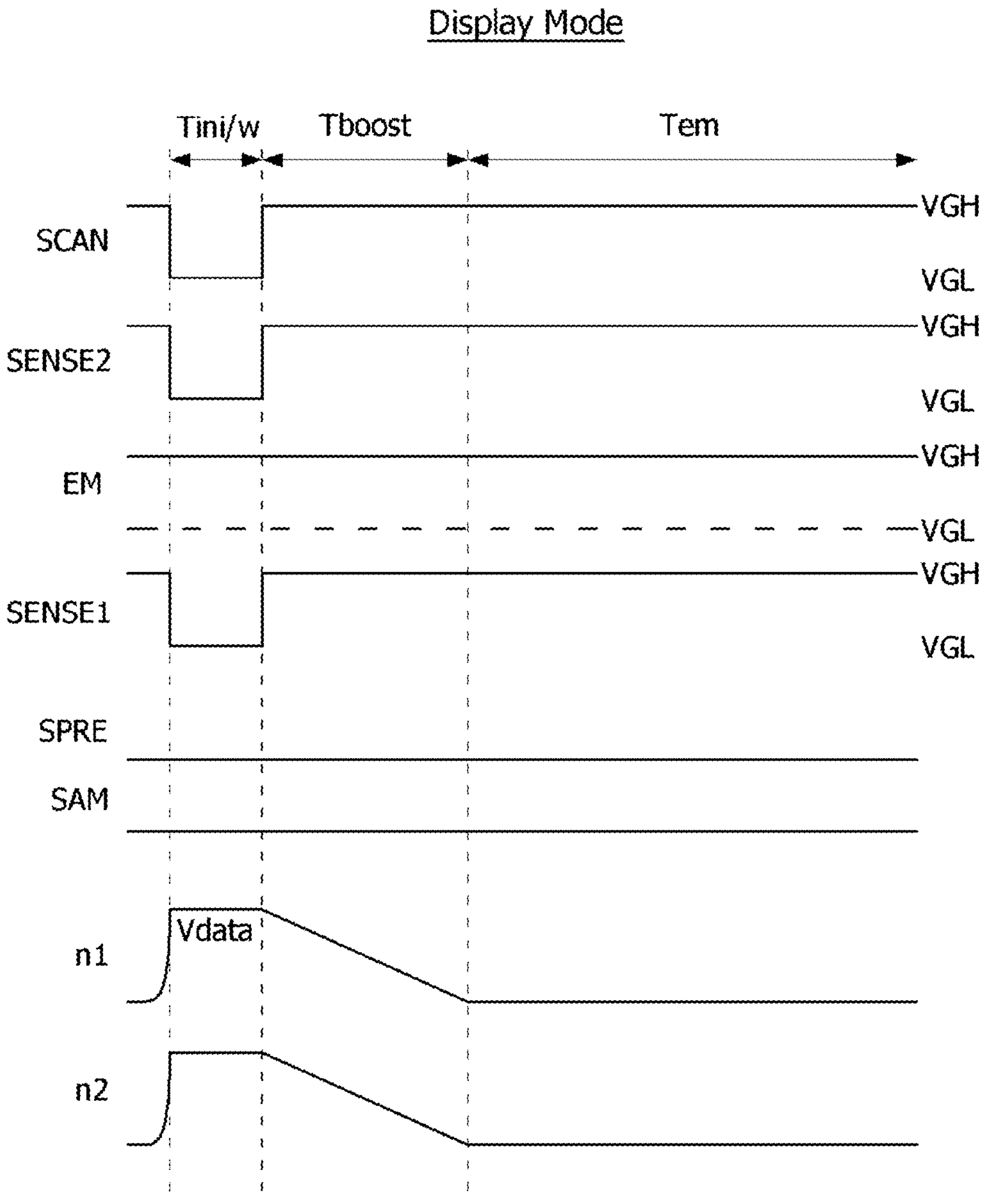
FIGS. 22A to 22C are diagrams explaining an operation for each mode of a pixel circuit illustrated in FIG. 21.
Figure 22B:
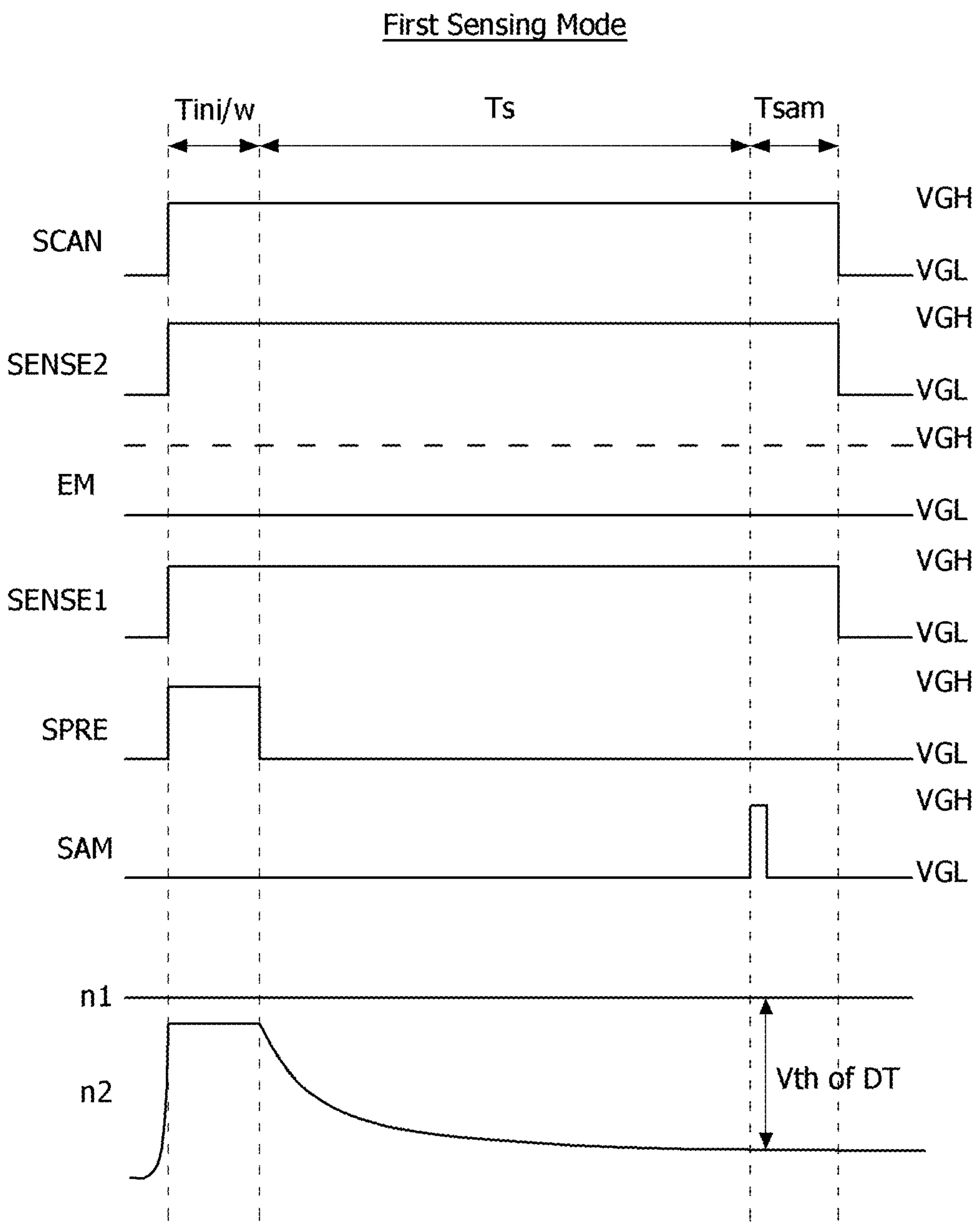
Figure 22C:
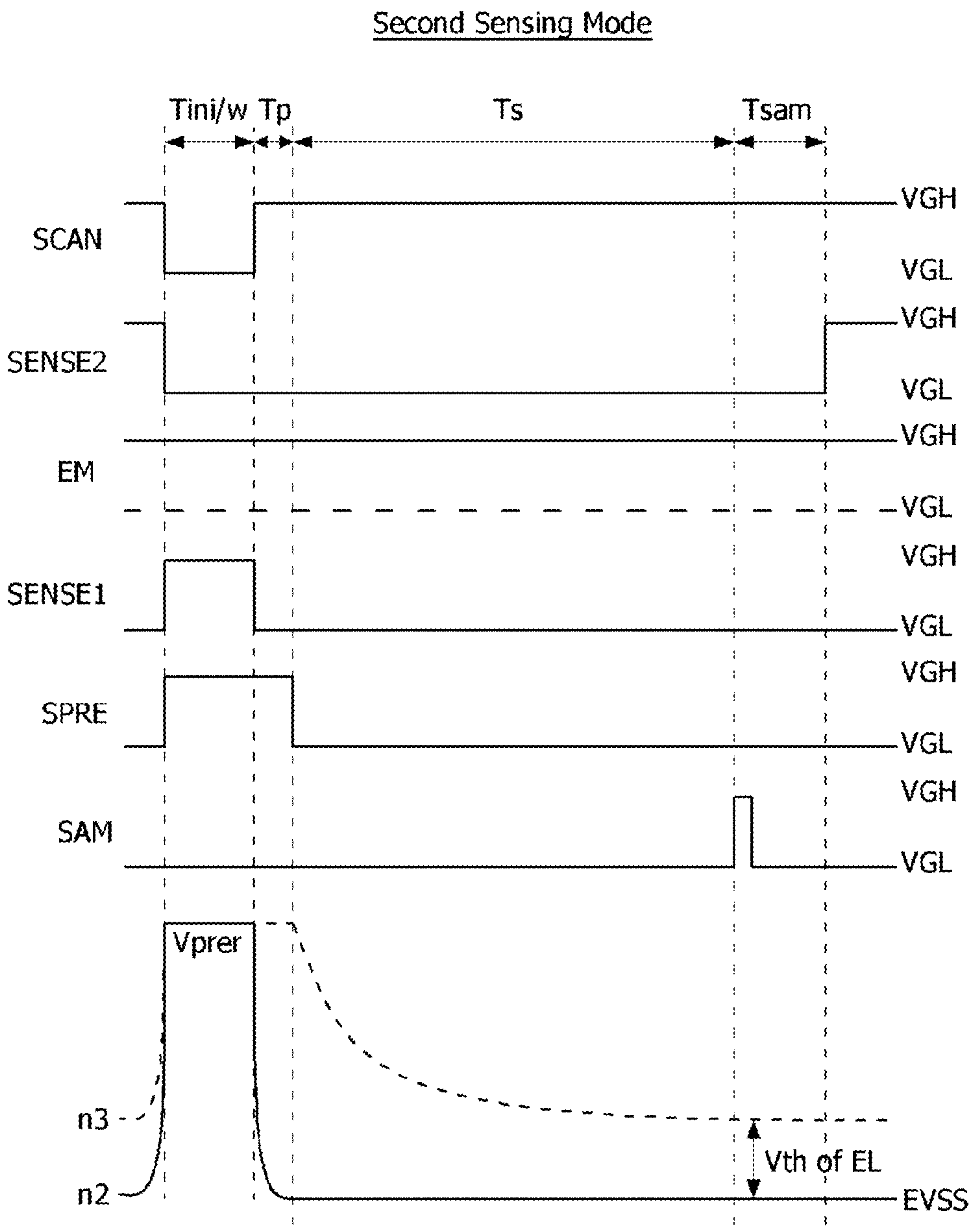

FIG. 21 is a diagram showing a pixel circuit and a compensation circuit according to a fourth embodiment of the present disclosure. FIGS. 22A to 22C are diagrams explaining an operation for each mode of a pixel circuit illustrated in FIG. 21.

As shown in FIG. 21, a pixel circuit according to a fourth embodiment includes a light-emitting element EL, a driving element DT that supplies current to the light-emitting element EL, a plurality of switch elements T1 to T4 which switch a current path connected to the driving element DT, and a capacitor Cst that stores a gate-source voltage of the driving element DT. The driving element DT and the switch elements T1 to T4 may be implemented as p-channel TFTs, but are not limited thereto.

The light-emitting element EL emits light by current that is applied through a channel of the driving element DT according to the gate-source voltage Vgs of the driving element DT that is changed according to a data voltage Vdata.

The driving element DT drives the light-emitting element EL by supplying current to the light-emitting element EL according to the gate-source voltage Vgs. The driving element DT includes a gate electrode connected to a first node n1, a first electrode (or source) connected to a second node n2, and a second electrode (or drain) connected to a pixel base voltage line to which a pixel base voltage EVSS is applied or a second power line 42.

The first switch element T1 is turned on according to a gate-on voltage of a first gate signal SCAN, and connects a data line DL to the first node n1 to supply the data voltage Vdata to the first node n1. The first switch element T1 includes a gate electrode to which the first gate signal SCAN is applied, a first electrode connected to the data line DL, and a second electrode connected to the first node n1.

The second switch element T2 is turned on according to a second gate signal SENSE1, and connects a sensing line SL to the second node n2 to apply a reference voltage Vprer to the second node n2. The second switch element T2 includes a gate electrode to which the second gate signal SENSE1 is applied, a first electrode connected to the second node n2, and a second electrode connected to the sensing line SL.

The third switch element T3 is turned on according to a gate-on voltage of a third gate signal SENSE2, and connects the sensing line SL to the third node n3 to supply a reference voltage Vprer to the third node n3. The third switch element T3 includes a gate electrode to which the third gate signal SENSE2 is applied, a first electrode connected to the third node n3, and a second electrode connected to the sensing line SL.

The fourth switch element T4 is turned on according to a gate-on voltage of a fourth gate signal EM, and connects a pixel driving voltage line to which a pixel driving voltage EVDD is applied or a first power line 41 to the third node n3. The fourth switch element T4 includes a gate electrode to which the fourth gate signal EM is applied, a first electrode connected to the first power line 41, and a second electrode connected to the third node n3.

The capacitor Cst may be connected between the first node n1 and the second node n2. The capacitor Cst may be charged with the gate-source voltage Vgs of the driving element DT.

A compensation circuit may include a sensing part 111 connected to the pixel circuit in each pixel. The sensing part 111 may sense the electrical characteristics of the pixels through the sensing line SL.

The sensing part 111 may be disposed in the data driver 110 together with a DAC.

The sensing part 111 may sense the electrical characteristics of the light-emitting element and the driving element for each pixel. The sensing part 111 may include an analog-to-digital converter (ADC), a first switch SPRE, and a second switch SAM.

In a display mode, the first switch SPRE connected to a reference voltage line to which a reference voltage Vprer is applied or a third power line 43 is turned on, and the second switch SAM is turned off, so that the reference voltage Vprer may be supplied to the pixel circuit through the sensing line SL.

In a sensing mode after the power-off, the first switch SPRE is turned off, and the second switch SAM connected to the ADC is turned on, so that the current that flows through a channel of the driving element DT, or the threshold voltage of the driving element DT and the threshold voltage of the light-emitting element EL may be sensed through the sensing line SL. The current that flows through the sensing line SL may be converted into digital data through the ADC, and the converted digital data may be transferred to the timing controller.

Since the pixel circuit according to the fourth embodiment is driven with the same constitution and the same operating mechanism as those of the pixel circuit according to the second embodiment although the only difference is that it is implemented with the p-channel TFTs, the detailed explanation of the driving method will be omitted.

As shown in FIG. 22A, in the display mode after the power-on of the display device, the pixel circuit may be driven in the order of an initialization and data writing period Tini/w, a boosting period Tboost, and a light emission period Tem, and thus the light-emitting element EL may emit light to display an image on the screen.

As shown in FIG. 22B, in the first sensing mode after the power-off of the display device, the pixel circuit may be driven in the order of an initialization and data writing period Tini/w, a sensing period Ts, and a sampling period Tsam, and the threshold voltage of the driving element DT may be sensed through the sensing line SL.

As shown in FIG. 22C, in the second sensing mode after the power-off of the display device, the pixel circuit may be driven in the order of an initialization and data writing period Tini/w, a programming period Tp, a sensing period Ts, and a sampling period Tsam, and the threshold voltage of the light-emitting element EL may be sensed through the sensing line SL.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A pixel circuit, comprising:

a driving element including a first electrode connected to a first power line, a gate electrode connected to a first node, and a second electrode connected to a second node;

a first switch element configured to apply a data voltage to the first node in response to a first gate signal;

a second switch element configured to connect a third node to the second node in response to a reset signal or the first gate signal;

a third switch element configured to connect a sensing line to the third node in response to a second gate signal;

a fourth switch element configured to connect a second power line to the third node in response to a third gate signal;

a capacitor connected between the first node and the second node; and a light-emitting element connected between the second node and the third node, wherein during a first sampling period for sampling a threshold voltage of the driving element, the second switch element and the third switch element are turned on, and wherein during a second sampling period for sampling a threshold voltage of the light-emitting element, the second switch element is turned off and the third switch element is turned on.

2. The pixel circuit of claim 1, wherein:

the pixel circuit is configured to be driven in the order of an initialization and data writing period, a sensing period, and the first sampling period in a first sensing mode for measuring a threshold voltage of the driving element; and during an entire period, the first to third switch elements are turned on, and the fourth switch element is turned off.

3. The pixel circuit of claim 1, wherein:

the pixel circuit is configured to be driven in the order of an initialization and data writing period, a programming period, a sensing period, and the second sampling period in a second sensing mode for measuring a threshold voltage of the light-emitting element;

during the initialization and data writing period, the first to third switch elements are turned on, and the fourth switch is turned off;

during the programming period, the first to second switch elements and the fourth switch element are turned off, and the third switch element is turned on; and during the second sampling period, the third switch element is switched to a turn-on state, and the first to second switch elements and the fourth switch element are all turned off.

4. The pixel circuit of claim 3, wherein in the second sensing mode, the data voltage configured to be applied to the first node is a data voltage corresponding to a maximum gamma voltage.

5. The pixel circuit of claim 1, wherein:

the first switch element comprises a gate electrode configured to receive the first gate signal, a first electrode connected to a data line configured to receive the data voltage, and a second electrode connected to the first node;

the second switch element includes a gate electrode configured to receive the reset signal or the first gate signal, a first electrode connected to the second node, and a second electrode connected to the third node;

the third switch element includes a gate electrode configured to receive the second gate signal, a first electrode connected to the third node, and a second electrode connected to the sensing line; and wherein the fourth switch element includes a gate electrode configured to receive the third gate signal, a first electrode connected to the third node, and a second electrode connected to the second power line.

6. A display device, comprising:

a pixel array including a plurality of data lines, a plurality of gate lines, and a plurality of pixel circuits;

a data driver configured to output a data voltage to the plurality of data lines; and a gate driver configured to output a gate signal to the plurality of gate lines, wherein each of the pixel circuits includes:

a driving element including a first electrode connected to a first power line, a gate electrode connected to a first node, and a second electrode connected to a second node;

a first switch element configured to apply a data voltage to the first node in response to a first gate signal;

a second switch element configured to connect a third node to the second node in response to a reset signal;

a third switch element configured to connect a sensing line to the third node in response to a second gate signal;

a fourth switch element configured to connect a second power line to the third node in response to a third gate signal;

a capacitor connected between the first node and the second node; and a light-emitting element connected between the second node and the third node, wherein during a first sampling period for sampling a threshold voltage of the driving element, the second switch element and the third switch element are turned on, and wherein during a second sampling period for sampling a threshold voltage of the light-emitting element, the second switch element is turned off and the third switch element is turned on.

7. The display device of claim 6, wherein:

the data driver comprises a sensing part configured to sense threshold voltages of the driving element and the light-emitting element through the sensing line; and the sensing part includes:

a first switch connected between the sensing line and a third power line;

an analog-to-digital converter (ADC) configured to convert a voltage sensed from the sensing line into digital data; and a second switch connected between the ADC and the sensing line.

8. The display device of claim 7, wherein:

the pixel circuit is configured to be driven in the order of an initialization and data writing period, a sensing period, and the first sampling period in a first sensing mode for measuring the threshold voltage of the driving element;

during the initialization and data writing period, the first switch is turned on, and the second switch is turned off;

during the sensing period, the first switch and the second switch are turned off; and during the first sampling period, the first switch is turned off, and the second switch is turned on.

9. The display device of claim 8, wherein the data driver is configured to:

apply a data voltage of a predetermined voltage level to the pixel circuit selected for sensing in the first sensing mode; and apply a data voltage of 0 V or a black grayscale to the non-selected pixel circuit.

10. The display device of claim 7, wherein:

the pixel circuit is configured to be driven in the order of an initialization and data writing period, a programming period, a sensing period, and the second sampling period in a second sensing mode for measuring the threshold voltage of the light-emitting element;

during the initialization and data writing period and the programming period, the first switch is turned on, and the second switch is turned off;

during the sensing period, the first switch and the second switch are turned off; and during the second sampling period, the first switch is turned off, and the second switch is turned on.

11. The display device of claim 10, wherein the data driver is configured to:

apply a data voltage generated by using a maximum gamma voltage to the pixel circuit selected for sensing in the second sensing mode; and apply a data voltage of 0 V or a black grayscale to the non-selected pixel circuit.

* * * * *